United States Patent
Ren et al.

(10) Patent No.: US 12,452,694 B2
(45) Date of Patent: Oct. 21, 2025

(54) METHODS AND APPARATUSES FOR SIGNAL TRANSMISSION, SIGNAL MEASUREMENT REPORTING, AND POSITIONING

(71) Applicant: DATANG MOBILE COMMUNICATIONS EQUIPMENT CO., LTD., Beijing (CN)

(72) Inventors: Bin Ren, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 802 days.

(21) Appl. No.: 17/607,900

(22) PCT Filed: Feb. 21, 2020

(86) PCT No.: PCT/CN2020/076259
§ 371 (c)(1),
(2) Date: Nov. 1, 2021

(87) PCT Pub. No.: WO2020/220803
PCT Pub. Date: Nov. 5, 2020

(65) Prior Publication Data
US 2022/0322105 A1 Oct. 6, 2022

(30) Foreign Application Priority Data
Apr. 30, 2019 (CN) .......................... 201910362318.7

(51) Int. Cl.
H04W 16/28 (2009.01)
H04W 64/00 (2009.01)
(Continued)

(52) U.S. Cl.
CPC ........... *H04W 16/28* (2013.01); *H04W 64/00* (2013.01); *H04W 72/0446* (2013.01); *H04W 72/23* (2023.01); *H04W 76/20* (2018.02)

(58) Field of Classification Search
None
See application file for complete search history.

(56) References Cited

U.S. PATENT DOCUMENTS

| 2017/0026938 A1* | 1/2017 | Onggosanusi | ........ H04W 24/10 |
| 2018/0332507 A1* | 11/2018 | Fujishiro | ......... H04W 36/00692 |

(Continued)

FOREIGN PATENT DOCUMENTS

| CN | 103209475 B | 5/2016 |
| CN | 108401264 A | 8/2018 |

(Continued)

OTHER PUBLICATIONS

Author Unknown, NR beam management supporting multi-gNB measurements for positioning, Doc. No. R1-1813583 pp. 1-8, Nov. 12, (Year: 2018).*

(Continued)

*Primary Examiner* — Christopher M Crutchfield
(74) *Attorney, Agent, or Firm* — KILPATRICK TOWNSEND & STOCKTON LLP

(57) ABSTRACT

Disclosed are methods and apparatuses for signal transmission, signal measurement reporting, and positioning. The signal measurement reporting method includes acquiring a cell-specific first reference signal (RS) sent by a network in the direction of M downlink beams of first downlink beam sets of different cells, and using first RS configuration information to measure the first RS to obtain a first beam information report value, and reporting same to the network, where M is greater than 1, and acquiring a second RS sent by the network in the direction of N downlink beams of (Continued)

second downlink beam sets of the different cells, and using second RS configuration information to measure the second RS to obtain a second beam information report value, and reporting same to the network, where 1<=N<M, the second downlink beam sets being determined by the network using the first beam information report value.

18 Claims, 9 Drawing Sheets

(51) Int. Cl.
*H04W 72/0446* (2023.01)
*H04W 72/23* (2023.01)
*H04W 76/20* (2018.01)

(56) References Cited

U.S. PATENT DOCUMENTS

| | | | |
|---|---|---|---|
| 2019/0068266 A1* | 2/2019 | Chang | H04L 5/0048 |
| 2019/0068315 A1 | 2/2019 | Rydén et al. | |
| 2019/0349031 A1* | 11/2019 | Xiang | H04B 7/088 |
| 2021/0359813 A1* | 11/2021 | Huang | H04L 5/0094 |
| 2021/0373118 A1* | 12/2021 | Bao | G01S 5/0236 |
| 2021/0409967 A1* | 12/2021 | Franke | H04W 24/10 |
| 2022/0069962 A1* | 3/2022 | Bao | H04W 72/044 |
| 2022/0086915 A1* | 3/2022 | Canonne-Velasquez | H04W 74/006 |
| 2022/0140969 A1* | 5/2022 | Cha | G01S 5/0263 455/452.1 |

FOREIGN PATENT DOCUMENTS

| | | | |
|---|---|---|---|
| CN | 108632836 A | | 10/2018 |
| CN | 109392000 A | | 2/2019 |
| EP | 18203980 | * | 6/2020 |
| KR | 20180108375 A | | 10/2018 |
| WO | 2017173201 A1 | | 10/2017 |
| WO | 2018232090 A1 | | 12/2018 |
| WO | 2019032887 A1 | | 2/2019 |
| WO | WO 2021/023912 | * | 9/2019 |

OTHER PUBLICATIONS

Author Unknown, Potential techniques for NR positioning, Doc. No. R1-1813452 pp. 1-8, Nov. 12 (Year: 2018).*
Author Unknown, NR beam management supporting multi-gNB measurements for positioning, Doc No. R1-1813583, pp. 1-8, Nov. 18, (Year: 2018).*
Author Unknown, Considerations on Techniques for NR positioning, Doc. No of R1-1812337, pp. 1-8, Nov. 16 (Year: 2018).*
LG Electronics,"Discussions on Possible Techniques for NR Positioning", 3GPP TSG RAN WG1 Meeting #95, Spokane, USA, Nov. 12-16, 2018, total 8 pages, R1-1812595.
Intel Corporation, "Analysis of Techniques for NR DL Positioning", 3GPP TSG RAN WG1 Ad-Hoc Meeting 1901, Taipei, Taiwan, Jan. 21-25, 2019, total 25 pages, R1-1900512.
Fraunhofer IIS et al.,"DL positioning considerations: Pattern Learning, RSS fingerprinting and Beams", 3GPP TSG RAN WG1Meeting AH 1901, Taipei, Taiwan, Jan. 21-25, 2019, total 11 pages, R1-1901182.
LG Electronics,"Discussions on UE and gNB measurements for NR Positioning", 3GPP TSG RAN WG1 #96bis, Xi'an, China, Apr. 8-12, 2019, total 3 pages, R1-1904201.
CATT, "Summary#3 of UE and gNB measurements for NR Positioning", 3GPP TSG RAN WG1 Meeting #96bis, Xi'an, China, Apr. 8-12, 2019, total 27 pages, R1-1905808.
Nokia et al.,"On beam grouping reporting in NR", 3GPP TSG-RAN WG1#88, Athens, Greece, Feb. 13-17, 2017, total 7 pages, R1-1703160.
LG Electronics,"Discussions on DL and UL Reference Signals for NR Positioning", 3GPP TSG RAN WG1 #96bis, Xi'an, China, Apr. 8-12, 2019, total 9 pages, R1-1904200.
CMCC,"Discussion on reference signal design for NR positioning", 3GPP TSG RAN WG1 #96bis, Xi'an, China, Apr. 8-12, 2019, total 2 pages,R1-1904740.
CATT,"DL and UL Reference Signals for NR Positioning", 3GPP TSG RAN WG1 #96bis, Xi'an, China, Apr. 8-12, 2019, total 27 pages, R1-1905346.

* cited by examiner

METHODS AND APPARATUSES FOR SIGNAL TRANSMISSION, SIGNAL MEASUREMENT REPORTING, AND POSITIONING

CROSS-REFERENCE TO RELATED APPLICATIONS

The present application is a National Stage of International Application No. PCT/CN2020/076259, filed on Feb. 21, 2020, which claims the priority of the Chinese patent application No. 201910362318.7 filed to the Chinese Patent Office on Apr. 30, 2019, and entitled "Method and Apparatuses for Signal Transmission, Signal Measurement Reporting, and Positioning", of which the entire contents are incorporated herein by reference.

FIELD

The present disclosure relates to the field of communication, in particular to signal communication, signal measurement reporting, and positioning methods and apparatuses.

BACKGROUND

A positioning reference signal (PRS) defined by long term evolution (LTE) is on the basis of cell-specific transmission. 5G NR has not defined how to specifically configure the PRS, but supports cell-specific based transmission.

However, the cell-specific transmission of the PRS brings a problem that when a base station has downlink transmission beams, the base station needs to allocate orthogonal PRS time frequency resources for downlink beams, resulting in large PRS resource overheads, and increasing received power consumption of a terminal.

SUMMARY

Embodiments of the present disclosure provide signal communication, signal measurement reporting, and positioning methods and apparatuses, to reduce resource overheads of reference signals, thus reducing terminal power consumption.

Embodiments of the present disclosure provide a signal measurement reporting method, applied to a terminal. The method includes: acquiring one or more cell-specific first reference signals (RSs) transmitted by a network side in M downlink beam directions of one or more first downlink beam sets for different cells, measuring the one or more cell-specific first RSs by using first RS configuration information to obtain one or more first beam information reporting values, and reporting the one or more first beam information reporting values to the network side, where M is greater than 1; and acquiring one or more second RSs transmitted by the network side in N downlink beam directions of one or more second downlink beam sets for the different cells, measuring the one or more second RSs by using second RS configuration information to obtain one or more second beam information reporting values, and reporting the one or more second beam information reporting values to the network side, where 1<=N<M, and the one or more second downlink beam sets are determined by the network side by using the one or more first beam information reporting values.

In one embodiment, the one or more first beam information reporting values include at least one of: a first beam information measurement value, a cell ID, an RS resource ID, or a beam direction.

In one embodiment, the first beam information measurement value includes at least one of: a reference signal received power (RSRP), a signal-to-interference and noise ratio (SINR), or a reference signal received quality (RSRQ).

In one embodiment, the one or more second beam information reporting values include at least one of: a reference signal time difference (RSTD), or a terminal receiving and transmitting (Rx-Tx) time difference.

In one embodiment, the second RS configuration information is configured by the network side in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

In one embodiment, where the one or more second RSs and the one or more cell-specific first RSs have a quasi co-location (QCL) association relationship.

In one embodiment, the one or more cell-specific first RSs include a new radio (NR) positioning reference signal (PRS), a synchronization signal and PBCH block (SSB), or a channel state information reference signal (CSI-RS); and the one or more second RSs include a NR PRS.

At a base station side, embodiments of the present disclosure provide a signal communication method, applied to a network side. The method includes: transmitting one or more cell-specific first reference signals (RSs) in M downlink beam directions of one or more first downlink beam sets for different cells, where M is greater than 1; and transmitting one or more second RSs in N downlink beam directions of one or more second downlink beam sets for the different cells, where 1<=N<M.

In one embodiment, the transmitting the one or more cell-specific first RSs in the M downlink beam directions of the one or more first downlink beam sets for the different cells, includes: transmitting the one or more cell-specific first RSs in the M downlink beam directions of the one or more first downlink beam sets for the different cells according to cell-specific first RS configuration information, where the cell-specific first RS configuration information is obtained from a positioning server LMF; and the transmitting the one or more second RSs in the N downlink beam directions of the one or more second downlink beam sets for the different cells, includes: transmitting the one or more second RSs in the N downlink beam directions of the one or more second downlink beam sets for the different cells according to second RS configuration information, where the second RS configuration information is obtained from the LMF.

In one embodiment, the transmitting the one or more cell-specific first RSs in the M downlink beam directions of the one or more first downlink beam sets for the different cells, includes: transmitting the one or more cell-specific first RSs in the M downlink beam directions of the one or more first downlink beam sets for the different cells according to cell-specific first RS configuration information, where the cell-specific first RS configuration information is obtained from a positioning server LMF; the method further includes: acquiring one or more first beam information reporting values for the different cells reported by a terminal in a current cell, and determining the one or more second downlink beam sets for the different cells by using a quasi co-location (QCL) association relationship of the one or more cell-specific first RSs and the one or more second RSs and the one or more first beam information reporting values; interacting the one or more second downlink beam sets between a serving gNB and a non-serving gNB of the terminal; and notifying the terminal of second RS configuration information of the one or more second downlink beam sets; and the transmitting the one or more second RSs in the N downlink beam directions of the one or more second downlink beam sets for the different cells, includes: transmitting the one or more second RSs in the N downlink beam directions of the one or more second downlink beam sets according to the second RS configuration information.

In one embodiment, the determining the one or more second downlink beam sets by using the QCL association relationship of the one or more cell-specific first RSs and the one or more second RSs and the one or more first beam information reporting values, includes: configuring one or more second downlink beam sets with different beam directions for each terminal of the different cells respectively by using the QCL association relationship of the one or more cell-specific first RSs and the one or more second RSs; or configuring one or more second downlink beam sets with a same beam direction for terminals in a same cell by using the QCL association relationship of the one or more cell-specific first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

At a positioning server side, embodiments of the present disclosure provide a positioning method, applied to a network side. The method includes: notifying a base station and a terminal of cell-specific first reference signal (RS) configuration information respectively to enable the base station to transmit one or more first RSs to the terminal according to the first RS configuration information, and to enable the terminal to receive the one or more first RSs according to the first RS configuration information, where the one or more first RSs are one or more cell-specific first RSs transmitted to the terminal in M downlink beam directions of one or more first downlink beam sets for different cells, and M is greater than 1; and acquiring one or more second beam information reporting values reported by the terminal by performing measurement on one or more second RSs by using second RS configuration information of one or more second downlink beam sets for the different cells, and calculating a location where the terminal is located based on the one or more second beam information reporting values, where the one or more second downlink beam sets include N downlink beam directions, and $1<=N<M$.

In one embodiment, the method further includes: acquiring one or more first beam information reporting values reported by the terminal based on the terminal performing measurement on the one or more first RSs; and determining the one or more second downlink beam sets by using a quasi co-location (QCL) association relationship of the one or more first RSs and the one or more second RSs and the one or more first beam information reporting values, and notifying the base station and the terminal of the second RS configuration information of the one or more second downlink beam sets.

In one embodiment, the determining the one or more second downlink beam sets by using the QCL association relationship of the one or more first RSs and the one or more second RSs and the one or more first beam information reporting values, includes: configuring one or more second downlink beam sets with different beam directions for each terminal of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered through a DCI signaling.

At a terminal side, embodiments of the present disclosure provide a signal measurement reporting apparatus. The apparatus includes: a memory, configured to store a program instruction; and a processor, configured to call the program instruction stored in the memory, and according to an obtained program, execute: acquiring one or more cell-specific first reference signals (RSs) transmitted by a network side in M downlink beam directions of one or more first downlink beam sets for different cells, measuring the one or more cell-specific first RSs by using first RS configuration information to obtain one or more first beam information reporting values, and reporting the one or more first beam information reporting values to the network side, where M is greater than 1; and acquiring one or more second RSs transmitted by the network side in N downlink beam directions of one or more second downlink beam sets for the different cells, measuring the one or more second RSs by using second RS configuration information to obtain one or more second beam information reporting values, and reporting the one or more second beam information reporting values to the network side, where 1<=N<M, and the one or more second downlink beam sets are determined by the network side by using the one or more first beam information reporting values.

In one embodiment, the one or more first beam information reporting values include at least one of: a first beam information measurement value, a cell ID, an RS resource ID, or a beam direction.

In one embodiment, the first beam information measurement value includes at least one of: a reference signal received power (RSRP), a signal-to-interference and noise ratio (SINR), or a reference signal received quality (RSRQ).

In one embodiment, the one or more second beam information reporting values include at least one of: a reference signal time difference (RSTD), or a terminal receiving and transmitting (Rx–Tx) time difference.

In one embodiment, the second RS configuration information is configured by the network side in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

In one embodiment, the one or more second RSs and the one or more cell-specific first RSs have a quasi co-location (QCL) association relationship.

In one embodiment, the one or more cell-specific first RSs include a new radio (NR) positioning reference signal (PRS), a synchronization signal and PBCH block (SSB), or a channel state information reference signal (CSI-RS); and the one or more second RSs include a NR PRS.

At a base station side, embodiments of the present disclosure provide a signal communication apparatus. The apparatus includes: a memory, configured to store a program instruction; and a processor, configured to call the program instruction stored in the memory, and according to an obtained program, execute: transmitting one or more cell-specific first reference signals (RSs) in M downlink beam directions of one or more first downlink beam sets for different cells, where M is greater than 1; and transmitting one or more second RSs in N downlink beam directions of one or more second downlink beam sets for the different cells, where 1<=N<M.

In one embodiment, the transmitting the one or more cell-specific first RS in the M downlink beam directions of the one or more first downlink beam sets for the different cells, includes: transmitting the one or more cell-specific first RSs in the M downlink beam directions of the one or more first downlink beam sets for the different cells according to cell-specific first RS configuration information, where the cell-specific first RS configuration information is obtained from a positioning server LMF; and the transmitting the one or more second RSs in the N downlink beam directions of the one or more second downlink beam sets for the different cells, includes: transmitting the one or more second RSs in the N downlink beam directions of the one or more second downlink beam sets for the different cells according to second RS configuration information, where the second RS configuration information is obtained from the LMF.

In one embodiment, the transmitting the one or more cell-specific first RSs in the M downlink beam directions of the one or more first downlink beam sets for the different cells, includes: transmitting the one or more cell-specific first RSs in the M downlink beam directions of the one or more first downlink beam sets for the different cells according to cell-specific first RS configuration information, where the cell-specific first RS configuration information is obtained from a positioning server LMF; the processor is further configured to: acquire one or more first beam information reporting value for the different cells reported by a terminal in a current cell, and determine the one or more second downlink beam sets for the different cells by using a quasi co-location (QCL) association relationship of the one or more cell-specific first RSs and the one or more second RSs and the one or more first beam information reporting values; interact the one or more second downlink beam sets between a serving gNB and a non-serving gNB of the terminal; and notify the terminal of the second RS configuration information of the one or more second downlink beam sets; and the transmitting the one or more second RSs in the N downlink beam directions of the one or more second downlink beam sets for the different cells, includes: transmitting the one or more second RSs in the N downlink beam directions of the one or more second downlink beam sets according to the second RS configuration information.

In one embodiment, the determining the one or more second downlink beam sets by using the QCL association relationship of the one or more cell-specific first RSs and the one or more second RSs and the one or more first beam information reporting values, includes: configuring one or more second downlink beam sets with different beam directions for each terminal of the different cells respectively by using the QCL association relationship of the one or more cell-specific first RSs and the one or more second RSs; or configuring one or more second downlink beam sets with a same beam direction for terminals in a same cell by using the QCL association relationship of the one or more cell-specific first RSs and the one or more second RSs in a case that terminals in the same cell have the same one or more same beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

At a positioning server side, embodiments of the present disclosure provide a positioning apparatus. The apparatus includes: a memory, configured to store a program instruction; and a processor, configured to call the program instruction stored in the memory, and according to an obtained program, execute: notifying a base station and a terminal of cell-specific first reference signal (RS) configuration information respectively to enable the base station to transmit one or more first RSs to the terminal according to the first RS configuration information, and to enable the terminal to receive the one or more first RSs according to the first RS configuration information, where the one or more first RSs are one or more cell-specific first RSs transmitted to the terminal in M downlink beam directions of one or more first downlink beam sets for different cells, and M is greater than 1; and acquiring one or more second beam information reporting values reported by the terminal by performing measurement on one or more second RSs by using second RS configuration information of one or more second downlink beam sets for the different cells, and calculating a location where the terminal is located based on the one or more second beam information reporting values, where the one or more second downlink beam sets include N downlink beam directions, and 1<=N<M.

In one embodiment, the processor is further configured to: acquire one or more first beam information reporting values reported by the terminal based on the terminal performing measurement on the one or more first RSs; and determine the one or more second downlink beam sets by using a quasi co-location (QCL) association relationship of the one or more first RSs and the one or more second RSs and the one or more first beam information reporting values, and notifying the base station and the terminal of the second RS configuration information of the one or more second downlink beam sets.

In one embodiment, the determining the one or more second downlink beam sets by using the QCL association relationship of the one or more first RSs and the one or more second RSs and the one or more first beam information reporting values, includes: configuring one or more second downlink beam sets with different beam directions for each terminal of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered through a DCI signaling.

At a terminal side, embodiments of the present disclosure provide another signal measurement reporting apparatus. The apparatus includes: a first reporting device, configured to acquire one or more cell-specific first reference signals (RSs) transmitted by a network side in M downlink beam directions of one or more first downlink beam sets for different cells, measure the one or more cell-specific first RSs by using first RS configuration information to obtain one or more first beam information reporting values, and report the one or more first beam information reporting values to the network side, where M is greater than 1; and a second reporting device, configured to acquire one or more second RSs transmitted by the network side in N downlink beam directions of one or more second downlink beam sets for the different cells, measure the one or more second RSs by using second RS configuration information to obtain one or more second beam information reporting values, and report the one or more second beam information reporting values to the network side, where 1<=N<M, and the one or more second downlink beam sets are determined by the network side by using the one or more first beam information reporting values.

At a base station side, embodiments of the present disclosure provide another signal communication apparatus. The apparatus includes: a first RS transmitting device, configured to transmit one or more cell-specific first reference signals (RSs) in M downlink beam directions of one or more first downlink beam sets for different cells, where M is greater than 1; and a second RS transmitting device, configured to transmit one or more second RSs in N downlink beam directions of one or more second downlink beam sets for the different cells, where 1<=N<M.

In one embodiment, the apparatus further includes: a configuration information notifying device, configured to acquire one or more first beam information reporting values for the different cells reported by a terminal in a current cell; determine the one or more second downlink beam sets for the different cells by using a quasi co-location (QCL) association relationship of the one or more cell-specific first RSs and the one or more second RSs and the one or more first beam information reporting values; interact the one or more second downlink beam sets between a serving gNB and a non-serving gNB of the terminal; and notify the terminal of second RS configuration information of the one or more second downlink beam sets.

At a positioning server side, embodiments of the present disclosure provide a positioning apparatus. The apparatus includes: a configuration information notifying device, configured to notify a base station and a terminal of cell-specific first reference signal (RS) configuration information respectively to enable the base station to transmit one or more first RSs to the terminal according to the first RS configuration information, and to enable the terminal to receive the one or more first RSs according to the first RS configuration information, where the one or more first RSs are one or more cell-specific first RSs transmitted to the terminal in M downlink beam directions of one or more first downlink beam sets for different cells, and M is greater than 1; and a positioning device, configured to acquire one or more second beam information reporting values reported by the terminal by performing measurement on one or more second RSs by using second RS configuration information of one or more second downlink beam sets for the different cells, and calculate a location where the terminal is located based on the one or more second beam information reporting values, where the one or more second downlink beam sets include N downlink beam directions, and 1<=N<M.

In one embodiment, the configuration information notifying device is further configured to: acquire one or more first beam information reporting values reported by the terminal based on the terminal performing measurement on the one or more first RSs; and determine the one or more second downlink beam sets by using a quasi co-location (QCL) association relationship of the one or more first RSs and the one or more second RS and the one or more first beam information reporting values, and notify the base station and the terminal of the second RS configuration information of the one or more second downlink beam sets.

Another embodiment of the present application provides a computing device, including a memory and a processor, and the memory is configured to store a program instruction, and the processor is configured to call the program instruction stored in the memory, and according to the obtained program, execute any above method.

Another embodiment of the present application provides a computer storage medium, and the computer storage medium stores a computer executable instruction, and the computer executable instruction is configured to enable a computer to execute any above method.

BRIEF DESCRIPTION OF THE DRAWINGS

In order to illustrate the embodiments of the present application more clearly, drawings needing to be used in description of the embodiments will be introduced below briefly. The drawings in the description below are only some embodiments of the present application.

DETAILED DESCRIPTION OF THE EMBODIMENTS

Figure 1:
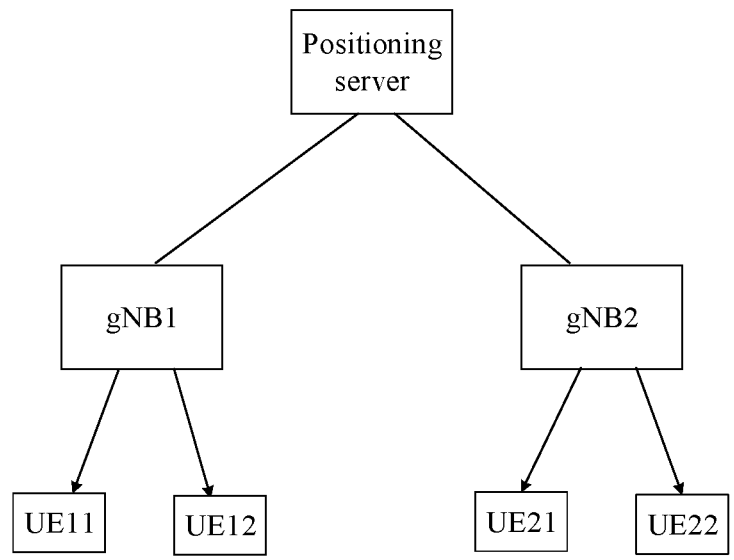
FIG. 1 is a schematic diagram of a scheme 1 at a network side provided by an embodiment of the present application.

The embodiments of the present application will be described clearly and completely with reference to the drawings in the embodiments of the present application. The described embodiments are only part of the embodiments of the present application, but not all the embodiments.

Embodiments of the present application provide signal communication, signal measurement reporting, and positioning methods and apparatuses, to reduce resource overheads of reference signals, thus reducing terminal power consumption.

The methods and the apparatuses are based on the same application concept, because principles of the methods and the apparatuses for solving the problems are similar, implementation of the apparatuses and the methods may refer to each other, and repetitions are omitted.

The embodiments of the present application may be applicable to various systems, especially a 5G system. For example, the applicable systems may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) system, the 5G system, a 5G NR system, etc. These various systems include terminal devices and network devices.

The terminal devices involved in the embodiments of the present application may be devices providing a user with voice and/or data connectivity, handheld devices having a wireless connection function, or other processing devices connected to a wireless modem. In the different systems, the terminal devices may also have different names, for example, in the 5G system, the terminal devices may be called user equipment (UE). The wireless terminal devices may be in communication with one or more core networks through a RAN, and the wireless terminal devices may be mobile terminal devices, such as a mobile telephone (or called "cellular" telephone) and a computer having the mobile terminal devices. For example, the wireless terminal devices may be a portable mobile apparatus, a pocket mobile apparatus, a handheld mobile apparatus, a computer built-in mobile apparatus or a vehicle-mounted mobile apparatus, which exchange languages and/or data with a radio access network, such as a personal communication service (PCS) telephone, a cordless telephone, a session initiated protocol (SIP) phone, a wireless local loop (WLL) station, a personal digital assistant (PDA), and other devices. The wireless terminal devices may also be called a system, a subscriber device, a subscriber station, a mobile station, a mobile, a remote station, an access point, a remote terminal, an access terminal, a user terminal, a user agent, and a user device, which is not limited in the embodiments of the present application.

The network devices involved in the embodiments of the present application may be a base station, and the base station may include cells. According to different specific application occasions, the base station may also called an access point, or may refer to devices in communication with the wireless terminal devices through one or more sectors on an air interface in an access network, or devices with other names. The network devices may be configured to interconvert a received air frame and an internet protocol (IP) group and serves as a router between the wireless terminal devices and remaining parts of the access network, and the remaining parts of the access network may include an IP communication network. The network devices may further coordinate attribute management to the air interface. For example, the network devices involved in the embodiments of the present application may be network devices (base transceiver station, BTS) in the global system of mobile communication (GSM) or code division multiple access (CDMA), or network devices (NodeB) in wide-band code division multiple access (WCDMA), or evolutional network devices (evolutional node B, eNB or e-NodeB) in a long term evolution (LTE) system, or a 5G base station in a 5G network architecture (next generation system), or a home evolved node B (HeNB), a relay node, a femto, a pico, etc., which is not limited in the embodiments of the present application.

All the embodiments of the present application are described in detail below with reference to the drawings of the specification. It should be noted that a display order of the embodiments of the present application only represents a sequential order of the embodiments.

In embodiments of the present application, UE receives one or more cell-specific first reference signals (RSs), configured by a network in advance, transmitted in M downlink beams directions in one or more first downlink beam sets (e.g., DLBeamSet1) for difference cells, measures the one or more cell-specific first RSs to obtain one or more first beam information measurement values of the UE for the different cells in one optimal downlink beam direction or optimized downlink beam directions, and reports the one or more first beam information reporting values to the network. M is an integer greater than 1. The first RS includes an NR PRS, an SSB (a primary synchronization signal (PSS)/a secondary synchronization signal (SSS/SS)/a physical broadcast channel (PBCH)) or a channel state indication reference signal (CSI-RS). For the one or more first beam information reporting values reported by the UE, the network further provides the UE with second RS configuration information and one or more second RSs corresponding to one or more second downlink beam sets (e.g., DLBeamSet2) for the different cells. The second RS includes the NR PRS. The second downlink beam set DLBeamSet2 includes N optimized downlink beam directions, where 1<=N<M. The UE measures the one or more second RSs by using the second RS configuration information to obtain one or more RS positioning measurement values corresponding to the optimal or optimized beam directions, and reports the one or more RS positioning measurement values to the network, and the network performs positioning calculation.

The first beam information measurement value includes but not limited to reference signal received power (RSRP), a signal-to-interference and noise ratio (SINR), and/or a reference signal received quality (RSRQ). The one or more RS positioning measurement values corresponding to the optimal or optimized beam directions include but not limited to a reference signal time difference (RSTD), or a UE receiving and transmitting time difference (i.e., Rx–Tx time difference). A measurement value RSTD corresponds to a positioning solution of an observed time difference of arrival, and a measurement value UE receiving and transmitting time difference corresponds to a positioning solution of an enhanced cell ID (E-CID) or a multi round-trip time (Multi-RTT).

The second RS configuration information of the second downlink beam sets DLBeamSet2 for the different cells is UE-specific or UE group-specific. The UE-specific indicates that each UE is separately configured with an RS beam direction, and the UE group-specific indicates that one group of UEs in a same cell is configured with a same RS beam direction. The UE-specific RS configuration mode or UE group-specific RS configuration mode is a periodic RS configuration, a semi-persistent RS configuration and/or an aperiodic RS configuration. The periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling. In one embodiment, the one or more second RSs and the one or more first RSs have a quasi co-location (QCL) association relationship. QCL refers to that large-scale parameters of a channel gone through by symbols on a certain antenna port are deduced from a channel gone through by symbols on another antenna port. The large-scale parameters include delay spread, average delay, Doppler spread, Doppler shift, an average gain, a space receiving parameter, etc. The present disclosure places emphasis on a space receiving parameter (namely, the beam direction). When the second RS and the first RS have the QCL relationship, the second RS obtains the large-scale parameters including the space receiving parameter defined by the QCL from the first RS.

Figure 3:
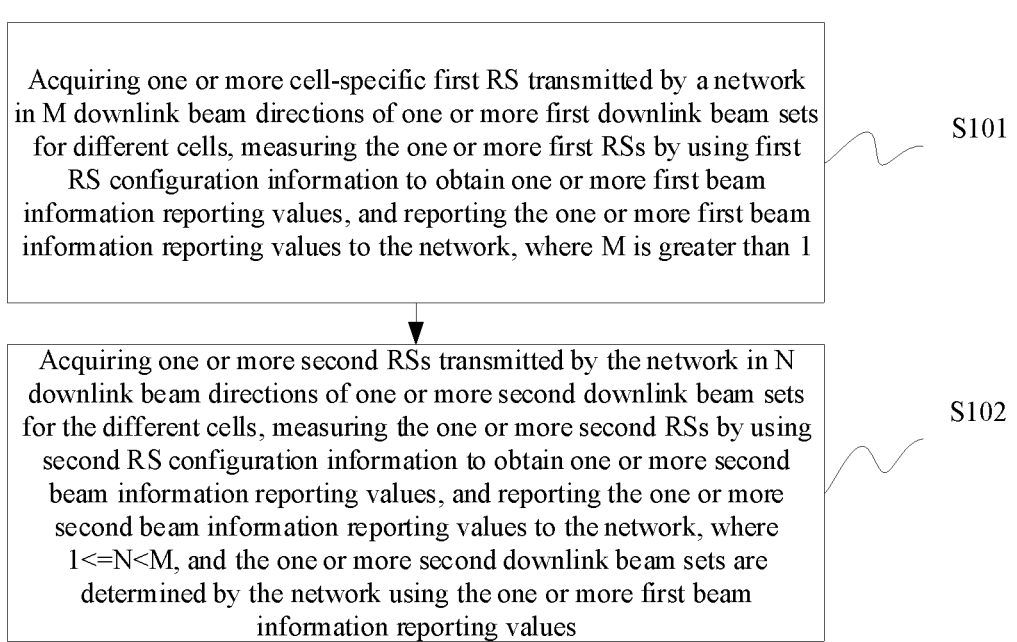
FIG. 3 is a schematic flow diagram of a signal measurement reporting method at a terminal side provided by an embodiment of the present application.

At a terminal side, referring to FIG. 3, a signal measurement reporting method provided by an embodiment of the present application, is applied to a terminal, and includes S101 and S102.

S101, one or more cell-specific first reference signals (RSs) transmitted by a network side in M downlink beam directions of one or more first downlink beam sets for different cells are acquired, the one or more first RSs are measured by using first RS configuration information to obtain one or more first beam information reporting values, and the one or more first beam information reporting values are reported to the network side, where M is greater than 1.

S102, one or more second RSs transmitted by the network side in N downlink beam directions of one or more second downlink beam sets for the different cells are acquired, the one or more second RSs are measured by using second RS configuration information to obtain one or more second beam information reporting values, and the one or more second beam information reporting values are reported to the network side, where 1<=N<M, and the one or more second downlink beam sets are determined by a network by using the one or more first beam information reporting values.

In one embodiment, the one or more first beam information reporting values include one or a combination of the following information: a first beam information measurement value, a cell ID, an RS resource ID, or a beam direction.

In one embodiment, the first beam information measurement value includes: a reference signal received power (RSRP), a signal-to-interference and noise ratio (SINR), and/or a reference signal received quality (RSRQ).

In one embodiment, the one or more second beam information reporting values include one or a combination of the following information: a reference signal time difference (RSTD), or a terminal receiving and transmitting (Rx-Tx) time difference.

In one embodiment, the second RS configuration information is configured by the network in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

In one embodiment, the one or more second RSs and the one or more first RSs have a quasi co-location (QCL) association relationship.

In one embodiment, the one or more first RSs include a new radio (NR) positioning reference signal (PRS), a synchronization signal and PBCH block (SS/PBCH block, SSB), or a channel state information reference signal (CSI-RS); and the one or more second RSs include a NR PRS.

Taking an example that the first RS and the second RS are both the PRS (the first RS is not limited to the NR PRS, and may also be the reference signals such as the SSB or the CSI-RS), the specific implementation solution is illustrated below, and described from the terminal, a network side gNB and a network side positioning server (LMF) respectively.

Specifically, for example, the following steps are executed at the terminal side.

Step 1), UE acquires cell-specific first PRS configuration information for different cells. The first PRS configuration information includes information such as a PRS time frequency resource, a PRS pattern and a PRS sequence corresponding to first downlink beam sets DLBeamSet1.

Step 2), the UE measures the first PRS in M downlink beam directions in the first downlink beam sets DLBeamSet1 for the different cells according to the first PRS configuration information to obtain a first beam information measurement value (including but not limited to RSRP, SINR and/or RSRQ), and determines a first beam information reporting value including the first beam information measurement value. The first beam information reporting value may only include a measurement value with a maximum value (corresponding to the optimal beam direction), or may also include first P measurement values greater than a preset threshold (corresponding to the optimized P beam directions), where $1<=P<M$.

Step 3), the UE reports the first beam information reporting value to an LMF or a serving gNB. Specifically, transmission to the LMF or the gNB is configured in advance according to the network, or the UE autonomously determines to report the first beam information reporting value to the LMF or the serving gNB.

The reported first beam information reporting value, for example, includes: the first beam information measurement value (e.g., RSRP, SINR and/or RSRQ), a cell ID, a PRS resource ID, or a beam direction.

Step 4), the UE acquires second PRS configuration information corresponding to the second downlink beam sets DLBeamSet2 through a RRC signaling, DCI signaling or LPP message.

Step 5), the UE measures the second PRS corresponding to the second downlink beam sets DLBeamSet2 according to the second PRS configuration information respectively to obtain a positioning measurement value corresponding to the optimal beam direction, and reports the second beam information reporting value to the LMF. The second beam information reporting value includes the positioning measurement value. The positioning measurement value includes but not limited to a RSTD and a UE receiving and transmitting time difference (i.e., $R_x$-$T_x$ time difference). The second beam information reporting value may further include a cell ID, a PRS resource ID and a beam direction.

Step 3) performed by the UE includes the following two cases.

CASE1: The UE reports the first beam information reporting value to the LMF.

CASE2: The UE reports the first beam information reporting value to the serving gNB.

For these two CASEs, according to different network side entities providing the UE with the second PRS configuration information corresponding to the second downlink beam sets DLBeamSet2, the network side includes the following two solutions.

Solution 1 (corresponding to the above CASE1): the LMF determines the second downlink beam sets DLBeamSet2 for the different cells received by the UE, and notifies the UE of the corresponding second PRS configuration information through an LPP signaling.

Solution 2 (corresponding to the above CASE2): the serving gNB determines the second downlink beam sets DLBeamSet2 for the different cells received by the UE, and interacts with a non-serving gNB through an Xn interface between the base stations, and then respective service base stations notify the UE of the second PRS configuration information corresponding to the respectively-managed UE through an RRC signaling or a DCI signaling.

Figure 4:
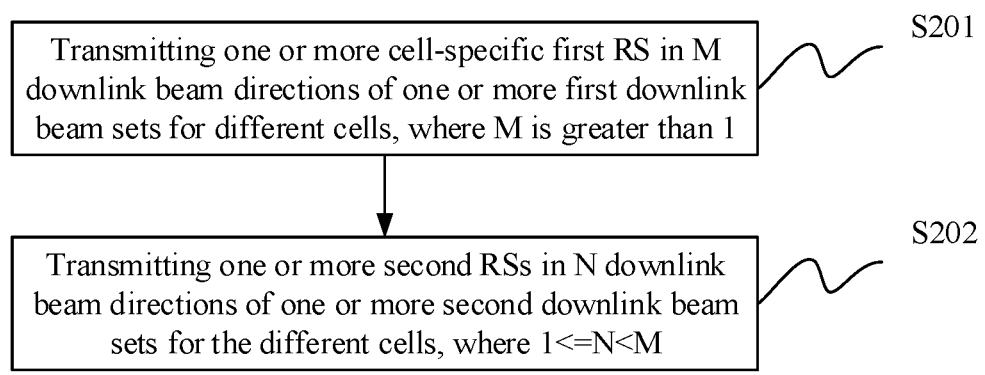
FIG. 4 is a schematic flow diagram of a signal communication method at a base station side provided by an embodiment of the present application.

Accordingly, at a base station side, referring to FIG. 4, a signal communication method provided by an embodiment of the present application, includes S201 and S202.

S201, one or more cell-specific first RS are transmitted in M downlink beam directions of one or more first downlink beam sets for different cells, where M is greater than 1.

S202, one or more second RSs are transmitted in N downlink beam directions of one or more second downlink beam sets for the different cells, where $1<=N<M$.

In one embodiment, solution 1: the transmitting the one or more cell-specific first RSs in the M downlink beam directions of the one or more first downlink beam sets for the different cells, includes: transmitting the one or more cell-specific first RSs in the M downlink beam of the one or more first downlink beam sets for the different cells according to cell-specific first RS configuration information, where the cell-specific first RS configuration information is obtained from a positioning server LMF; and the transmitting the one or more second RSs in the N downlink beam directions of the one or more second downlink beam sets for the different cells, includes: transmitting the one or more second RSs in the N downlink beam directions of the one or more second downlink beam sets for the different cells according to second RS configuration information, where the second RS configuration information is obtained from the LMF.

In one embodiment, solution 2: the transmitting the one or more cell-specific first RS in the M downlink beam directions of the one or more first downlink beam sets for the different cells, includes: transmitting the one or more cell-specific first RSs in the M downlink beam directions of the one or more first downlink beam sets for the different cells according to cell-specific first RS configuration information, where the cell-specific first RS configuration information is obtained from a positioning server LMF; the method further includes: acquiring one or more first beam information reporting values for the different cells reported by a terminal in a current cell, and determining the one or more second downlink beam sets for the different cells by using a QCL association relationship of the one or more first RSs and the one or more second RSs as well as the one or more first beam information reporting values; interacting the one or more second downlink beam sets between a serving gNB and a non-serving gNB of the terminal; and notifying the terminal of second RS configuration information of the one or more second downlink beam sets; and the transmitting the one or more second RSs in the N downlink beam directions of the one or more second downlink beam sets for the different cells, includes: transmitting the one or more second RSs in the N downlink beam directions of the one or more second downlink beam sets according to the second RS configuration information.

In one embodiment, the determining the one or more second downlink beam sets by using the QCL association relationship of the one or more first RSs and the one or more second RSs as well as the one or more first beam information reporting values, includes: configuring one or more second downlink beam sets with different beam directions for each terminal of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

The method at the base station side provided by the above embodiment of the present application is applicable to the service base station gNB of the terminal, and also applicable to a non-serving gNB of the terminal. That is, the method is applicable to any base station.

Figure 5:
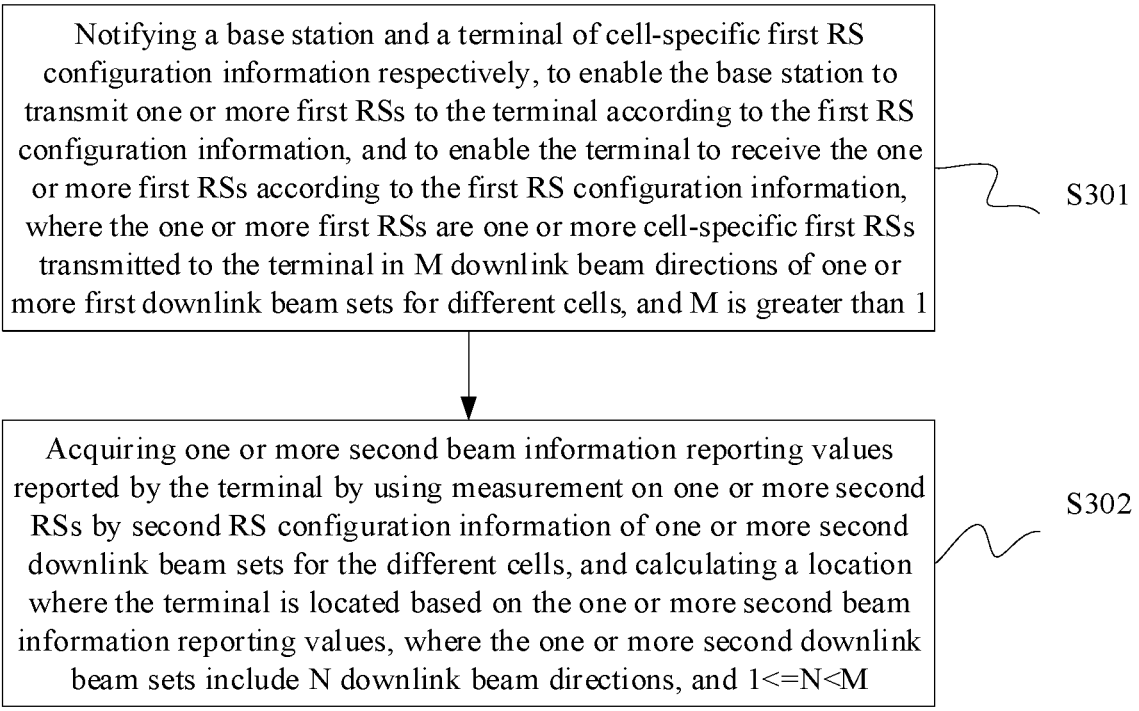
FIG. 5 is a schematic flow diagram of a positioning method at a positioning server side provided by an embodiment of the present application.

Accordingly, at an LMF side, referring to FIG. 5, a positioning method (corresponding to the above solution 2) provided by an embodiment of the present application includes S301 and S302.

S301, a base station and a terminal are notified of cell-specific first reference signal (RS) configuration information respectively, so that the base station transmits one or more first RSs to the terminal according to first RS configuration information, and the terminal receives the one or more first RSs according to the first RS configuration information, where the one or more first RSs are one or more cell-specific first RSs transmitted to the terminal in M downlink beam directions of one or more first downlink beam sets for different cells, and M is greater than 1.

S302, one or more second beam information reporting values reported by the terminal by performing measurement on one or more second RSs by using second RS configuration information of one or more second downlink beam sets for the different cells are acquired, and a location where the terminal is located is calculated based on the one or more second beam information reporting values, where the one or more second downlink beam sets include N downlink beam directions, and 1<=N<M.

In one embodiment, for the above solution 1, the method further includes: acquiring one or more first beam information reporting values reported by the terminal based on the terminal performing measurement on the one or more first RSs; and determining the one or more second downlink beam sets by using a QCL association relationship of the one or more first RSs and the one or more second RSs and the one or more first beam information reporting values, and notifying the base station and the terminal of the second RS configuration information of the one or more second downlink beam sets.

In one embodiment, the determining the one or more second downlink beam sets by using the QCL association relationship of the one or more first RSs and the one or more second RSs and the one or more first beam information reporting values, includes: configuring one or more second downlink beam sets with different beam directions for each terminal of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic reference signal (PRS) configuration, a semi-persistent PRS configuration and an aperiodic PRS configuration.

In one embodiment, the periodic PRS configuration is triggered by a radio resource control (RRC) signaling, a downlink control information (DCI) signaling or an LTE positioning protocol (LPP) message; and the semi-persistent PRS configuration and the aperiodic PRS configuration are triggered through a DCI signaling.

The two network side solutions are introduced below.

The network side solution 1, referring to FIG. 1, includes a positioning server (LMF), a first base station gNB1, a second base station gNB2, UE11, UE12, UE21 and UE22, where the gNB1 is a service base station of the UE11 and the UE12, and the gNB2 is a service base station of the UE21 and the UE22.

A network side gNB, the following steps 1) to 4) are performed.

Step 1) a serving gNB and a non-serving gNB acquire cell-specific first PRS (such as NR PRS, SSB signal or CSI-RS) configuration information through the LMF. The first PRS configuration information includes information such as a PRS time frequency resource, a PRS pattern and a PRS sequence corresponding to first downlink beam sets DLBeamSet1.

Step 2) the serving gNB and the non-serving gNB transmit a cell-specific first PRS (such as NR PRS, SSB signal or CSI-RS) to the UE according to the first PRS configuration information. The gNB adopts the different downlink beams on the different first PRS time frequency resources to transmit the first PRS, to scan transmitted beams of all the downlink beams.

Step 3) the serving gNB and the non-serving gNB receive second PRS configuration information of second downlink beam sets DLBeamSet2 notified by the LMF.

Step 4) the serving gNB and the non-serving gNB adopt the second PRS configuration information of the second downlink beam sets DLBeamSet2 to transmit a second PRS (NR PRS, SSB signal or CSI-RS) to the UE.

The above step flow at the base station side may be applicable to the service base station of the terminal, or the non-service base station of the terminal. That is, the above step flow is applicable to both gNB1 and gNB2 in the figure.

Accordingly, at the network side and the LMF side, the following steps 1) and 2) are performed.

Step 1), the LMF notifies all the gNBs and UE of the cell-specific first PRS (such as NR PRS, SSB signal or CSI-RS) configuration information respectively. The first PRS configuration information includes the information such as the PRS time frequency resource, the PRS pattern and the PRS sequence corresponding to the first downlink beam sets DLBeamSet1.

The LMF directly transmits to the UE through an LPP signaling (that is, unvarnished transmission to the UE by being borne in the RRC signaling), or transmit to the gNB through the LPP signaling, and the gNB converts the LPP signaling into the RRC signaling, and then transmits the RRC signaling to the UE.

Step 2), the LMF acquires the first beam information reporting values (including beam information measurement values) reported by all the UE in the different cells, and determines the second downlink beam sets DLBeamSet2 according to the reported beam information measurement values by using the QCL association relationship of the first RS and the second RS, which specifically includes two determining modes.

Mode 1, each user in the different cells is configured with the second downlink beam sets DLBeamSet2 with one optimal or N1 optimized different beam directions.

Mode 2, when users in the same cell have one or N2 same beam directions, the second downlink beam sets DLBeamSet2 with the same beam direction are configured for the group of users.

Step 3) the LMF notifies all the gNBs and UE of the second PRS configuration information of the second downlink beam sets DLBeamSet2 through the LPP signaling respectively.

Step 4) the LMF receives the second beam information reporting value reported by the UE for measurement on the second PRS, to obtain a positioning measurement value therefrom, and calculates a location of the UE terminal in combination with information such as a base station antenna location. The positioning measurement value includes but not limited to an RSTD and a UE receiving and transmitting time difference (i.e. Rx–Tx time difference).

Figure 2:
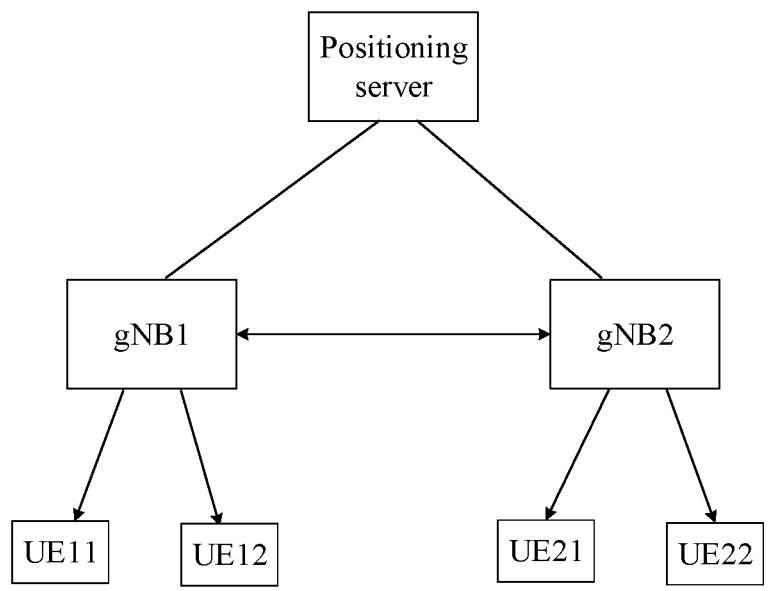
FIG. 2 is a schematic diagram of a scheme 2 at a network side provided by an embodiment of the present application.

A network side solution 2, referring to FIG. 2, includes a positioning server (LMF), a first base station gNB1, a second base station gNB2, UE11, UE12, UE21 and UE22, and the gNB1 is a service base station of the UE11 and the UE12, and the gNB2 is a service base station of the UE21 and the UE22.

The main difference between the solution 2 and the solution 1 lies in the different steps 3) at the network side gNB, and lies in that the network side LMF only contains step 1) and step 4) of the solution 1.

A network side gNB.

Step 1) the step is the same as step 1) of the gNB in the network side solution 1.

Step 2) the step is the same as step 2) of the gNB in the network side solution 1.

Step 3) a serving gNB acquires first beam information reporting values (including beam information measurement values) for different cells reported by all the UE in the current cell, and determines second downlink beam sets DLBeamSet2 according to the beam information measurement values included in the first beam information reporting values by using a QCL association relationship of a first RS and a second RS, specifically, for example, which may include two modes: first, each UE in the different cells is configured with the second downlink beam sets DLBeamSet2 with one optimal or N1 beam directions; and second, when UE in the same cell have one or N2 same beam directions, the second downlink beam sets DLBeamSet2 with the same beam direction are configured for the group of UE.

Step 3.1), the serving gNB and a non-serving gNB interact the second downlink beam sets DLBeamSet2.

Step 3.2), the serving gNB and the non-serving gNB notify the UE in the cell managed by the current gNB of the second PRS configuration information of the second downlink beam sets DLBeamSet2, and the notification may be carried through the RRC signaling or the DCI signaling.

Step 4) the step is the same as step 4) of the gNB in the network side solution 1.

The above step flow at the base station side may be applicable to the service base station of the terminal, or the non-service base station of the terminal. That is, the above step flow is applicable to both gNB1 and gNB2 in the figure.

Accordingly, at the network side and the LMF side.

Step 1) the step is the same as step 1) of the LMF in the network side solution 1.

Step 2) the step is the same as step 4) of the LMF in the network side solution 1. Several overall flow embodiments are given below.

Embodiment 1

Embodiment 1 is based on the network side solution 1.

In step 1) of the UE side, the cell-specific NR PRS is adopted as the first PRS.

In step 2) of the UE side, the first beam information measurement value adopts the RSRP, and the first beam information reporting value only includes the first beam information measurement value with the maximum value (namely, N=1).

In step 3) of the UE side, the first beam information reporting value is reported to the LMF.

In step 4) of the UE side, the UE obtains the second PRS configuration information corresponding to the second downlink beam sets DLBeamSet2 through the LPP message, and the second downlink beam set DLBeamSet2 of each UE only has one optimal PRS beam for the corresponding cell.

In step 5) of the UE side, the positioning measurement value is the RSTD for an OTDOA positioning solution.

Figure 6:
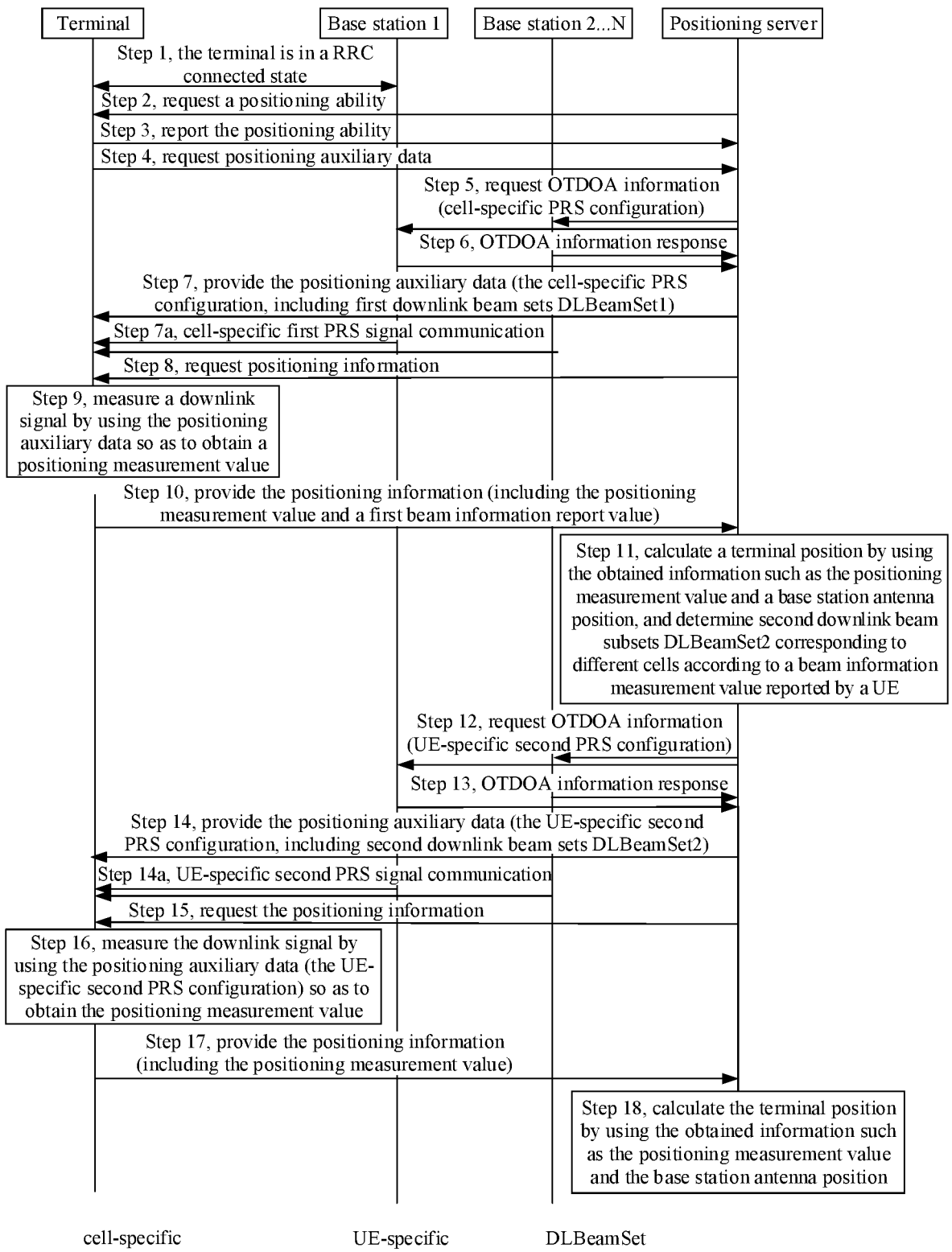
FIG. 6 is a schematic diagram of a positioning flow based on a UE-specific PRS provided by an embodiment of the present application.

As shown in FIG. 6, the specific step introduction is given below.

Step 1, after the UE establishes connection with a BS, the UE is in a radio resource control connected (RRC CONNECTED) state.

Step 2, the positioning server transmits a "positioning ability request" message to the UE to request the UE to notify the positioning server of a positioning function for being supported by the UE.

Step 3, the UE transmits a "positioning ability provide" message to respond to the positioning server. The "positioning ability provide" message reports a positioning ability of a new generation radio access network (NG-RAN) OTDOA supported by the UE, namely, the terminal.

Step 4, when downlink positioning auxiliary data is needed, the UE transmits a "positioning auxiliary data request" message to the positioning server. The message includes that the positioning server is requested to provide OTDOA auxiliary data.

Step 5, the positioning server transmits an "OTDOA information request (NRPPa OTDOA INFORMATION REQUEST)" message to the base station (BS), to request the BS to provide downlink positioning auxiliary data. The downlink positioning auxiliary data includes the cell-specific first PRS configuration information. The first PRS configuration information includes the information such as the PRS time frequency resource, the PRS pattern and the PRS sequence corresponding to the first downlink beam sets DLBeamSet1.

Step 6, the base station transmits an "OTDOA information response (NRPPa OTDOA INFORMATION RESPONSE)" message to the positioning server. The requested downlink positioning auxiliary data is provided to the positioning server and includes the cell-specific first PRS configuration information of the first downlink beam sets.

Step 7, the positioning server provides the positioning auxiliary data requested by the UE in a "positioning auxiliary data provide" message. The positioning auxiliary data carries the cell-specific first PRS configuration information, including the first downlink beam sets DLBeamSet1.

Step 7a, all the BSs transmit the cell-specific first PRS to the UE.

Step 8, the positioning server transmits a "positioning information request" message to the UE, to request the UE to measure a downlink PRS of the BS, and to request the UE to reply a measured positioning measurement value.

Step 9, the UE measures a downlink signal by using the positioning auxiliary data (for example: PRS configuration data) to obtain the positioning measurement value (for example, the RSTD).

Step 10, the UE provides positioning information to the LMF, including the positioning measurement value and the first beam information reporting value. The first beam information reporting value only includes the first beam information measurement value RSRP with the maximum value (corresponding to the optimal beam direction).

Step 11, the LMF calculates a location where the terminal is located by using the obtained information such as the positioning measurement value and the base station antenna location, and determines second downlink beam sets DLBeamSet2 corresponding to the different cells according to the first beam information reporting value reported by the UE and the QCL association relationship of the second PRS and the first PRS, and the second downlink beam set DLBeamSet2 of each UE only has one optimal PRS beam for the corresponding cell.

Step 12, the positioning server transmits an "OTDOA information request (UE-specific second PRS configuration)" message to the BS.

Step 13, the BS transmits an "OTDOA information response (UE-specific second PRS configuration)" message to the positioning server.

Step 14, the positioning server provides the UE with the positioning auxiliary data (UE-specific second PRS configuration, including the second downlink beam sets DLBeamSet2).

Step 14a, all the BSs transmit the UE-specific second PRS to the UE.

Step 15, the positioning server transmits a "positioning information request" message to the UE.

Step 16, the UE measures a downlink signal by using the positioning auxiliary data (UE-specific second PRS configuration information) to obtain the positioning measurement value.

Step 17, the UE provides the LMF with positioning information (including the positioning measurement value in a direction of a beam with the best quality).

Step 18, the LMF calculates the terminal location by using the obtained information such as the positioning measurement value and the base station antenna location.

Embodiment 2

The difference between embodiment 2 and embodiment 1 lies in the followings.

First, the UE adopts a cell-specific SSB signal as the first PRS.

Second, in step 3) of the UE side, the first beam information reporting value is reported to the serving gNB.

Third, the positioning measurement value is the UE receiving and transmitting time difference (Rx–Tx time difference) for a Multi-RTT positioning solution.

Embodiment 2 is based on the network side solution 2.

In step 1) at the UE side, the cell-specific SSB signal is adopted as the first PRS.

In step 2) at the UE side, the first beam information measurement value adopts the RSRP, and the first beam information reporting value includes the first beam information measurement value with the maximum value (namely, N=1).

In step 3) at the UE side, the first beam information reporting value is reported to the serving gNB.

In step 4) at the UE side, the UE obtains the second PRS configuration information of the second downlink beam sets DLBeamSet2 through the LPP message, and the second downlink beam set DLBeamSet2 of each UE only has one optimal PRS beam for the corresponding cell.

In step 5) at the UE side, the positioning measurement value is the UE receiving and transmitting time difference (i.e., Rx–Tx time difference) for the Multi-RTT positioning solution.

Figure 7:
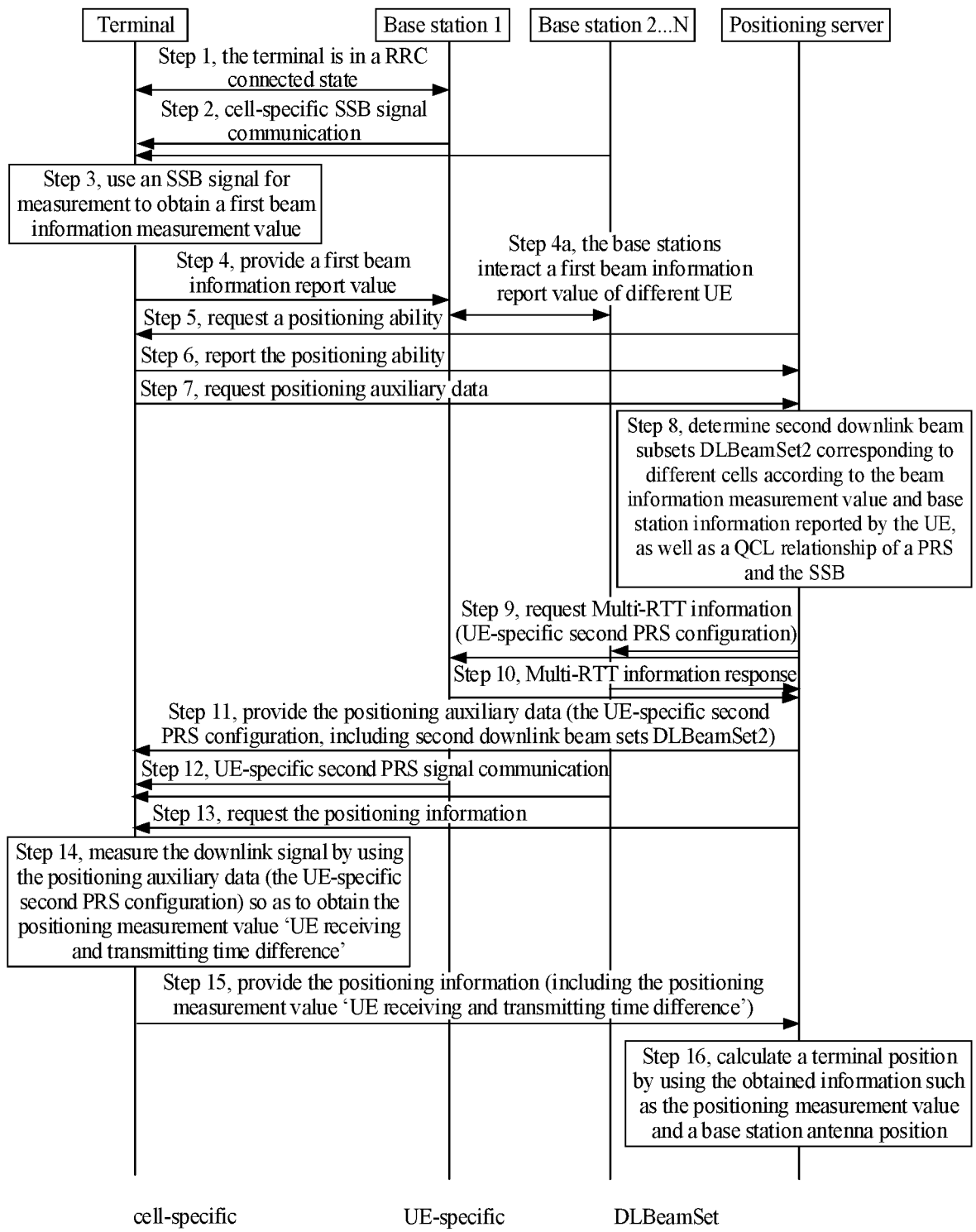
FIG. 7 is a schematic diagram of a positioning flow based on a UE-specific PRS provided by an embodiment of the present application.

As shown in FIG. 7, the specific step introduction of embodiment 2 is given below.

Step 1, after the UE establishes connection with a BS, the UE is in a radio resource control connected (RRC CONNECTED) state.

Step 2, all the gNBs transmit a cell-specific SSB signal to the UE for the different cells respectively.

Step 3, the UE uses the SSB signal for measurement to obtain a first beam state information measurement value.

Step 4, the UE reports a first beam state information reporting value to the serving gNB, including the beam direction with the maximum measurement value for the different cells measured by the UE.

Step 4a, all the gNBs interact the first beam state information reporting values of the different UE.

Step 5, the positioning server transmits a "positioning ability request" message to the UE to request the UE to notify the server of a positioning function for being supported by the UE.

Step 6, the UE transmits a "positioning ability provide" message to respond to the positioning server. The "positioning ability provide" message reports a positioning ability of a NG-RAN OTDOA supported by the UE, namely, the terminal.

Step 7, when downlink positioning auxiliary data is needed, the UE transmits a "positioning auxiliary data request" message to the positioning server. The message includes that the positioning server is requested to provide OTDOA auxiliary data.

Step 8, the LMF determines second downlink beam subsets DLBeamSet2 corresponding to the different cells according to the beam information measurement value RSRP and the base station information reported by the UE, and the QCL relationship of the PRS and the SSB.

Step 9, the positioning server transmits a "Multi-RTT information request (containing UE-specific second PRS configuration)" message to the BS.

Step 10, the BS transmits a "Multi-RTT information response (containing the UE-specific second PRS configuration)" message to the positioning server.

Step 11, the positioning server provides the UE with the positioning auxiliary data (the UE-specific second PRS configuration, including the second downlink beam sets DLBeamSet2).

Step 12, all the BSs transmit the UE-specific second PRS to the UE.

Step 13, the positioning server transmits a "positioning information request" message to the UE.

Step 14, the UE measures a downlink second PRS by using the positioning auxiliary data (the UE-specific second PRS configuration) to obtain the positioning measurement value.

Step 15, the UE provides the LMF with positioning information (including the positioning measurement value in a direction of a beam with the best quality).

Step 16, the LMF calculates the location where the terminal is located by using the obtained information such as the positioning measurement value and a base station antenna location.

Embodiment 3

The difference between embodiment 3 and embodiment 1 lies in the following three points.

First, the cell-specific NR PRS is adopted as the first PRS, and the cell-specific first PRS and the UE-specific second PRS may adopt different PRS time frequency resources, PRS patterns and PRS sequences. For example, the cell-specific first PRS is based on a P-PRS with a conventional density and an OFDM symbol quantity, and the UE-specific second PRS is based on an S-PRS with the higher density and the more OFDM symbol quantity.

Second, the first beam information reporting value includes two first beam information measurement values with the maximum value and the second largest value (namely, N=2).

Third, the first beam information measurement value adopts the RSRQ, rather than the RSRP.

Embodiment 3 is based on the network side solution 1.

In step 1) at the UE side, the cell-specific NR PRS is adopted as the first PRS.

In step 2) at the UE side, the first beam information measurement value adopts the RSRQ, where the first beam information reporting value includes the two first beam information measurement values with the maximum value and the second largest value (namely, N=2).

In step 3) at the UE side, the first beam information reporting value is reported to the LMF.

In step 4) at the UE side, the UE obtains the PRS configuration information of the second downlink beam sets DLBeamSet2 through the LPP message, and the second downlink beam set DLBeamSet2 of each UE has two preferred PRS beams (an optimal beam and a suboptimal beam) for the corresponding cell.

In step 5) at the UE side, the positioning measurement value is the RSTD for the OTDOA positioning solution.

Figure 8:
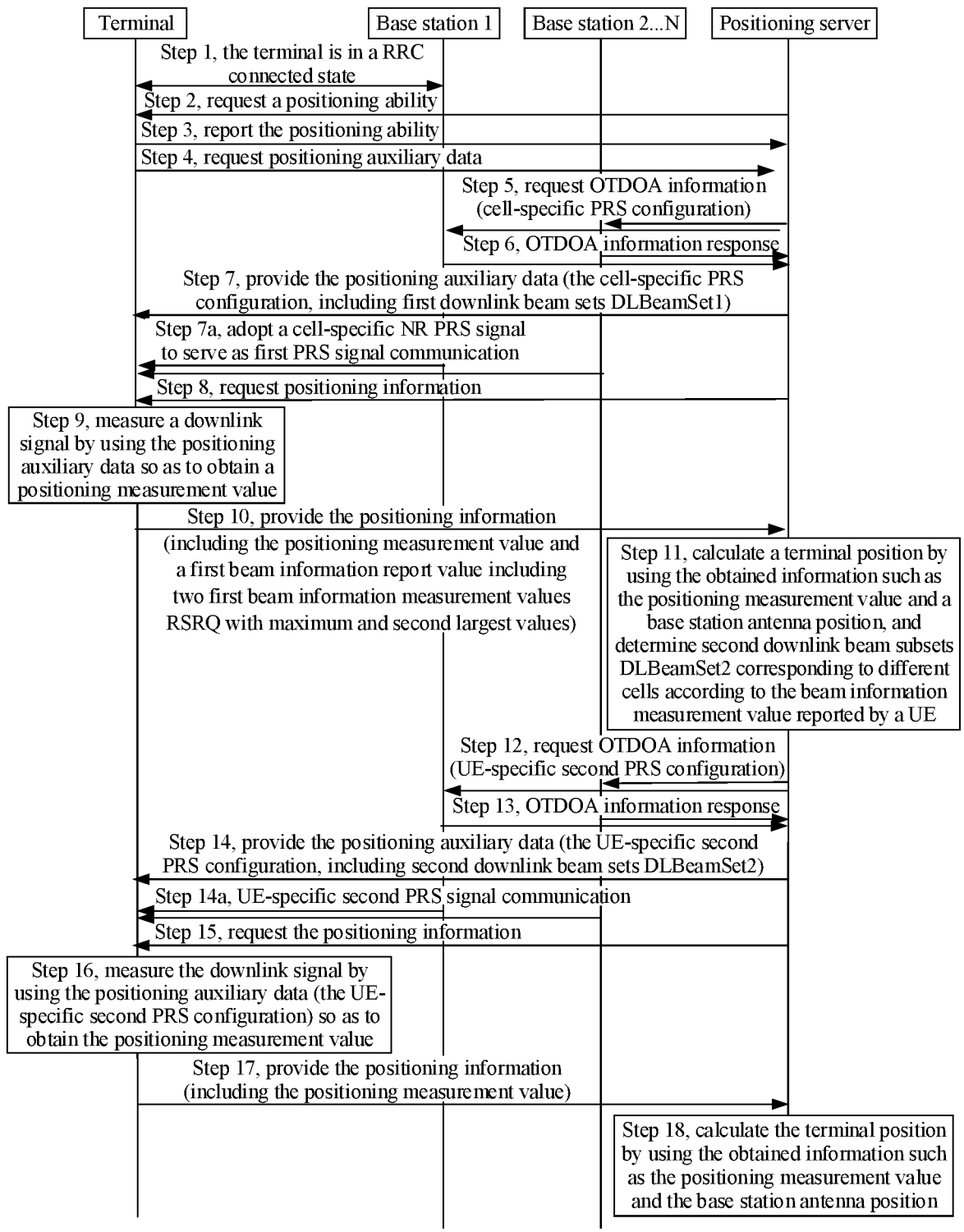
FIG. 8 is a schematic diagram of a positioning flow based on a UE-specific PRS provided by an embodiment of the present application.

As shown in FIG. 8, the specific step introduction of embodiment 3 is given below.

Step 1, after the UE establishes connection with a BS, the UE is in a radio resource control connected (RRC CONNECTED) state.

Step 2, the positioning server transmits a "positioning ability request" message to the UE to request the UE to notify the server of a positioning function for being supported by the UE.

Step 3, the UE transmits a "positioning ability provide" message to respond to the positioning server. The "positioning ability provide" message reports a positioning ability of a NG-RAN OTDOA supported by the UE, namely, the terminal.

Step 4, when downlink positioning auxiliary data is needed, the UE transmits a "positioning auxiliary data request" message to the positioning server. The message includes that the positioning server is requested to provide OTDOA auxiliary data.

Step 5, the positioning server transmits an "OTDOA information request (NRPPa OTDOA INFORMATION REQUEST)" message to the BS, the message requests the BS to provide the downlink positioning auxiliary data, including the cell-specific PRS configuration information, namely, the first PRS configuration information, and the PRS configuration information includes the information such as the PRS time frequency resource, the PRS pattern and the PRS sequence corresponding to the first downlink beam sets DLBeamSet1.

Step 6, OTDOA information response.

Step 7, the positioning server provides the positioning auxiliary data requested by the UE in a "positioning auxiliary data provide" message, and the positioning auxiliary data carries the cell-specific first PRS configuration information, including the first downlink beam sets DLBeamSet1.

Step 7a, all the BSs transmit the cell-specific first PRS to the UE.

Step 8, the positioning server transmits a "positioning information request" message to the UE. The message requests the UE to measure the downlink PRS of the BS, and to reply a measured positioning measurement value.

Step 9, the UE measures a downlink signal by using the positioning auxiliary data (for example: PRS configuration data) to obtain the positioning measurement value (for example, the RSTD).

Step 10, the UE provides positioning information to the LMF, including the positioning measurement value and the first beam information reporting value, and the first beam information reporting value includes the two first beam information measurement values RSRQ with the maximum value and the second largest value (corresponding to the optimal and suboptimal beam directions).

Step 11, the LMF calculates the terminal location by using the obtained information such as the positioning measurement value and the base station antenna location, and determines the second PRS configuration information of the UE under the different cells according to first optimal beam information measurement values under the different cells reported by the UE and the QCL association relationship of the second PRS and the first PRS.

Step 12, the positioning server transmits an "OTDOA information request (UE-specific second PRS configuration)" message to the BS.

Step 13, the BS transmits an "OTDOA information response (NRPPa OTDOA INFORMATION RESPONSE)" message to the positioning server. The requested downlink positioning auxiliary data is provided to the positioning server, including PRS configuration data.

Step 14, the positioning server provides the UE with the positioning auxiliary data (the UE-specific second PRS configuration, including the second downlink beam sets DLBeamSet2, and the second downlink beam set DLBeamSet2 of each UE has the two preferred PRS beams for the corresponding cell).

Step 14a, all the BSs transmit the UE-specific second PRS to the UE.

Step 15, the positioning server transmits a "positioning information request" message to the UE.

Step 16, the UE measures a downlink signal by using the positioning auxiliary data (the UE-specific second PRS configuration) to obtain the positioning measurement value.

Step 17, the UE provides the LMF with positioning information (including the positioning measurement value in a direction of a beam with the best quality).

Step 18, the LMF calculates the location where the terminal is located by using the obtained information such as the positioning measurement value and the base station antenna location.

Embodiment 4

The difference between embodiment 4 and embodiment 1 lies in the following points.

First, the UE adopts the cell-specific SSB signal as the first PRS.

Second, the first beam information measurement value adopts the SINR, rather than the RSRP.

Third, in step 3) at the UE side, the first beam information reporting value is reported to the serving gNB.

Fourth, the positioning measurement value is the UE receiving and transmitting time difference (Rx–Tx time difference) for the Multi-RTT positioning solution.

Embodiment 4 is based on the network side solution 2.

In step 1) at the UE side, the cell-specific SSB signal is adopted as the first PRS.

In step 2) at the UE side, the first beam information measurement value adopts the SINR, and the first beam information reporting value includes two first beam information measurement values with the maximum value and the second largest value (namely, N=2).

In step 3) at the UE side, the first beam information reporting value is reported to the serving gNB.

In step 4) at the UE side, the UE obtains the second PRS configuration information of the second downlink beam sets DLBeamSet2 through the LPP message, and the second downlink beam set DLBeamSet2 of each UE has two preferred PRS beams (an optimal beam and a suboptimal beam) for the corresponding cell.

In step 5) at the UE side, the positioning measurement value is the UE receiving and transmitting time difference (i.e., Rx–Tx time difference) for the Multi-RTT positioning solution.

Figure 9:
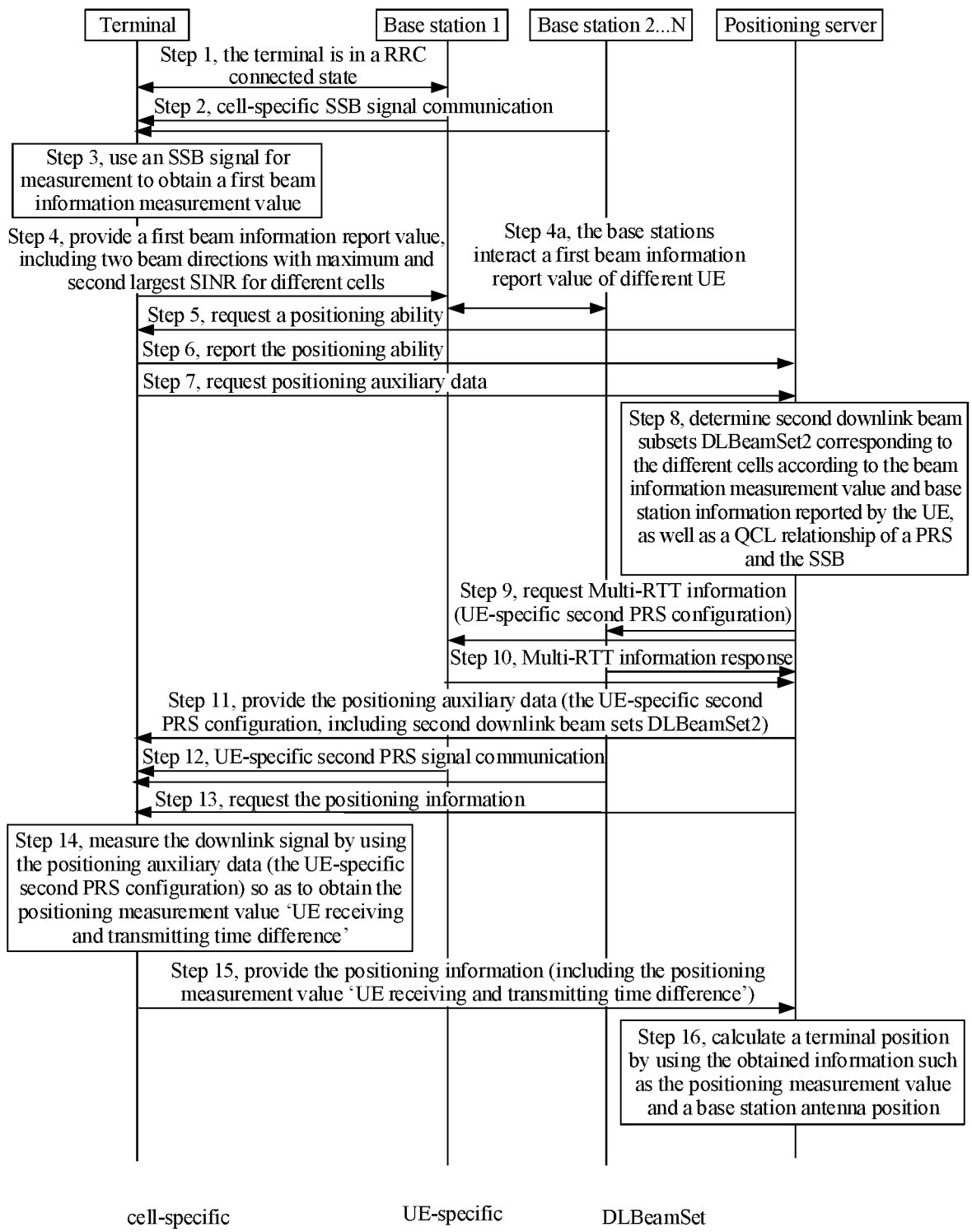
FIG. 9 is a schematic diagram of a positioning flow based on a UE-specific PRS provided by an embodiment of the present application.

As shown in FIG. 9, the specific step introduction of embodiment 4 is given below.

Step 1, after the UE establishes connection with a BS, the UE is in a radio resource control connected (RRC CONNECTED) state.

Step 2, all gNBs transmit the cell-specific SSB signal to the UE for the different cells.

Step 3, the UE uses the SSB signal for measurement to obtain a first beam state information measurement value.

Step 4, the UE reports a first beam state information reporting value to the serving gNB, including the two beam directions with the maximum and second largest SINR measurement values for the different cells measured by the UE.

Step 4a, all the gNBs interact the first beam state information reporting values of the different UE.

Step 5, the positioning server transmits a "positioning ability request" message to the UE to request the UE to notify the server of a positioning function for being supported by the UE.

Step 6, the UE transmits a "positioning ability provide" message to respond to the positioning server. The "positioning ability provide" message reports a positioning ability of a NG-RAN OTDOA supported by the UE, namely, the terminal.

Step 7, when downlink positioning auxiliary data is needed, the UE transmits a "positioning auxiliary data request" message to the positioning server. The message includes that the positioning server is requested to provide OTDOA auxiliary data.

Step 8, second downlink beam subsets DLBeamSet2 corresponding to the different cells are determined according to the beam information measurement value SINR and the base station information reported by the UE, and the QCL relationship of the PRS and the SSB.

Step 9, the positioning server transmits a "Multi-RTT information request (including UE-specific second PRS configuration)" message to the BS.

Step 10, the BS transmits a "Multi-RTT information response (including the UE-specific second PRS configuration)" message to the positioning server.

Step 11, the positioning server provides the UE with positioning auxiliary data (the UE-specific second PRS configuration, including the second downlink beam sets DLBeamSet2).

Step 12, all the BSs transmit the UE-specific second PRS to the UE.

Step 13, the positioning server transmits a "positioning information request" message to the UE.

Step 14, the UE measures a downlink second PRS by using the positioning auxiliary data (the UE-specific second PRS configuration) to obtain the positioning measurement value.

Step 15, the UE provides the LMF with positioning information (including the positioning measurement value in a direction of a beam with the best quality).

Step 16, the LMF calculates the terminal location by using the obtained information such as the positioning measurement value and the base station antenna location.

Apparatuses provided by the embodiments of the present application are introduced below.

Figure 10:
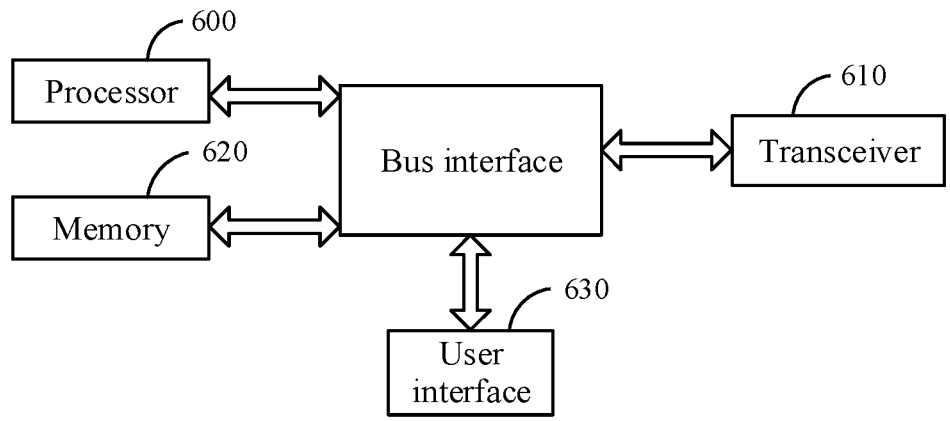
FIG. 10 is a schematic structural diagram of a signal measurement reporting apparatus at a terminal side provided by an embodiment of the present application.

At a terminal side, referring to FIG. 10, a signal measurement reporting apparatus provided by an embodiment of the present application, includes: a memory 620, configured to store a program instruction; and a processor 600, configured to call the program instruction stored in the memory, and according to an obtained program, execute: acquiring one or more cell-specific first reference signals (RSs) transmitted by a network in M downlink beam directions of one or more first downlink beam sets for different cells, measuring the one or more first RSs by using first RS configuration information to obtain one or more first beam information reporting values, and reporting the one or more first beam information reporting values to the network, where M is greater than 1; and acquiring one or more second RSs transmitted by the network in N downlink beam directions of one or more second downlink beam sets for the different cells, measuring the one or more second RSs by using second RS configuration information to obtain one or more second beam information reporting values, and reporting the one or more second beam information reporting values to the network, where 1<=N<M, and the one or more second downlink beam sets are determined by the network by using the one or more first beam information reporting values.

In one embodiment, the one or more first beam information reporting values includes one or a combination of the following information: a first beam information measurement value, a cell ID, an RS resource ID, or a beam direction.

In one embodiment, the first beam information measurement value includes: reference signal received power (RSRP), a signal-to-interference and noise ratio (SINR), and/or a reference signal received quality (RSRQ).

In one embodiment, the one or more second beam information reporting values includes one or a combination of the following information: a reference signal time difference (RSTD), or a terminal receiving and transmitting (Rx–Tx) time difference.

In one embodiment, the second RS configuration information is configured by the network in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

In one embodiment, the one or more second RSs and the one or more first RSs have a quasi co-location (QCL) association relationship.

In one embodiment, the one or more first RSs include a new radio (NR) positioning reference signal (PRS), a synchronization signal and PBCH block (SSB), or a channel state information reference signal (CSI-RS); and the one or more second RSs include a NR PRS.

A transceiver 610, configured to receive and transmit data under control of the processor 600.

In FIG. 10, a bus architecture may include any number of interconnected buses and bridges, which are specifically linked together by various circuits of one or more processors represented by the processor 600 and a memory represented by the memory 620. The bus architecture may further link various other circuits such as a peripheral device, a voltage stabilizer and a power management circuit together, which are publicly known in the art and therefore are not further described herein. A bus interface provides an interface. The transceiver 610 may be components, namely, including a transmitter and a receiver, and provides a device configured to be in communication with various other apparatuses on a transmission medium. Aiming at different user equipment, a user interface 630 may further be an interface for being externally connected and internally connected with required devices, and the connected devices include, but not limited to, a keypad, a display, a loudspeaker, a microphone, a joystick, etc.

The processor 600 is responsible for managing the bus architecture and usual processing, and the memory 620 may store data used by the processor 600 during operation execution.

In one embodiment, the processor 600 may be a central processing unit (CPU), an application specific integrated circuit (ASIC), a field-programmable gate array (FPGA), or a complex programmable logic device (CPLD).

Figure 11:
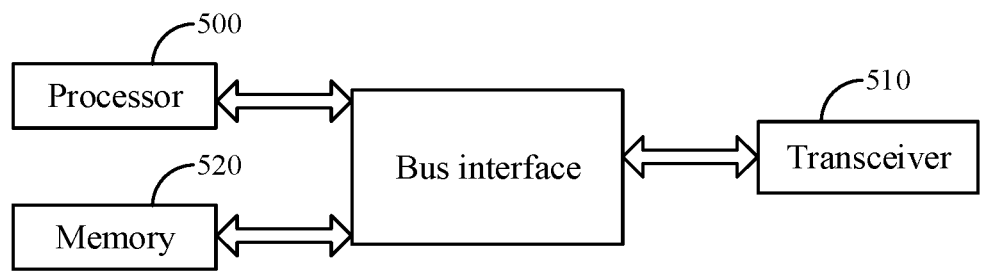
FIG. 11 is a schematic structural diagram of a signal communication apparatus at a base station side provided by an embodiment of the present application.

At a base station side, referring to FIG. 11, a signal communication apparatus provided by an embodiment of the present application, includes: a memory 520, configured to store a program instruction; and a processor 500, configured to call the program instruction stored in the memory, and according to an obtained program, execute: transmitting one or more cell-specific first reference signals (RSs) in M downlink beam directions of one or more first downlink beam sets for different cells, and M is greater than 1; and transmitting one or more second RSs in N downlink beam directions of one or more second downlink beam sets for the different cells, where 1<=N<M.

In one embodiment, the transmitting the one or more cell-specific first RS in the M downlink beam directions of the one or more first downlink beam sets for the different cells, includes: transmitting the one or more cell-specific first RSs in the M downlink beam directions of the one or more first downlink beam sets for the different cells according to cell-specific first RS configuration information, where the first RS configuration information is obtained from a positioning server LMF.

Transmitting the one or more second RSs in the N downlink beam directions of the one or more second downlink beam sets for the different cells, includes: transmitting the one or more second RSs in the N downlink beam directions of the one or more second downlink beam sets according to second RS configuration information, where the second RS configuration information is obtained from the LMF.

In one embodiment, the transmitting the one or more cell-specific first RSs in the M downlink beam directions of the one or more first downlink beam sets for the different cells, includes: transmitting the one or more cell-specific first RSs in the M downlink beam directions of the one or more first downlink beam sets for the different cells according to cell-specific first RS configuration information, where the first RS configuration information is obtained from a positioning server LMF.

The processor 500 is further configured to: acquire one or more first beam information reporting values for the different cells reported by a terminal in a current cell, and determine the one or more second downlink beam sets for the different cells by using a QCL association relationship of the one or more first RSs and the one or more second RSs and the one or more first beam information reporting values; interact the one or more second downlink beam sets between a serving gNB and a non-serving gNB of the terminal; and notify the terminal of second RS configuration information of the one or more second downlink beam sets.

Transmitting the one or more second RSs in the N downlink beam directions of the one or more second downlink beam sets for the different cells, includes: transmitting the one or more second RSs in the N downlink beam directions of the one or more second downlink beam sets according to the second RS configuration information.

In one embodiment, the determining the one or more second downlink beam sets by using the QCL association relationship of the one or more first RSs and the one or more second RSs and the one or more first beam information reporting values, includes: configuring one or more second downlink beam sets with different beam directions for each terminal of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

A transceiver 510, configured to receive and transmit data under control of the processor 500.

In FIG. 11, a bus architecture may include any number of interconnected buses and bridges, which are specifically linked together by various circuits of one or more processors represented by the processor 500 and a memory represented by the memory 520. The bus architecture may further link various other circuits such as a peripheral device, a voltage stabilizer and a power management circuit together, which are publicly known in the art and therefore are not further described herein. A bus interface provides an interface. The transceiver 510 may be components, namely, including a transmitter and a receiver, and provides a device configured to be in communication with various other apparatuses on a transmission medium. The processor 500 is responsible for managing the bus architecture and usual processing, and the memory 520 may store data used by the processor 500 during operation execution.

The processor 500 may be a central processing unit (CPU), an application specific integrated circuit (ASIC), a field-programmable gate array (FPGA), or a complex programmable logic device (CPLD).

Figure 12:
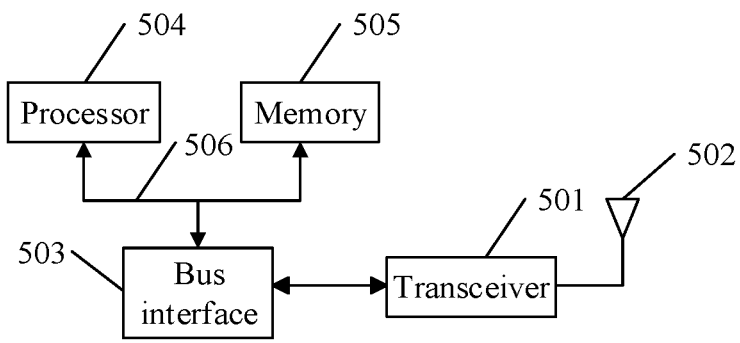
FIG. 12 is a schematic structural diagram of a positioning apparatus at a positioning server side provided by an embodiment of the present application.

At a positioning server side, referring to FIG. 12, a positioning apparatus provided by an embodiment of the present application, includes: a memory 505, configured to store a program instruction; and a processor 504, configured to call the program instruction stored in the memory, and according to an obtained program, execute: notifying a base station and a terminal of cell-specific first reference signal (RS) configuration information respectively, to enable the base station to transmit one or more first RSs to the terminal according to the first RS configuration information, and to enable the terminal to receive the one or more first RSs according to the first RS configuration information, where the one or more first RSs are one or more cell-specific first RSs transmitted to the terminal in M downlink beam directions of one or more first downlink beam sets for different cells, and M is greater than 1; and acquiring one or more second beam information reporting values reported by the terminal by performing measurement on one or more second RSs by second RS configuration information of one or more second downlink beam sets for the different cells, and calculating a location where the terminal is located based on the one or more second beam information reporting values, where the one or more second downlink beam sets include N downlink beam directions, and 1<=N<M.

In one embodiment, the processor 504 is further configured to: acquire one or more first beam information reporting values reported by the terminal based on the terminal performing measurement on the one or more first RSs; and determine the one or more second downlink beam sets by using a QCL association relationship of the one or more first RSs and the one or more second RSs and the one or more first beam information reporting values, and notify the base station and the terminal of the second RS configuration information of the one or more second downlink beam sets.

In one embodiment, the determining the one or more second downlink beam sets by using the QCL association relationship of the one or more first RSs and the one or more second RSs and the one or more first beam information reporting values, includes: configuring one or more second downlink beam sets with different beam directions for each terminal of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered through a DCI signaling.

A transceiver 501, configured to receive and transmit data under control of the processor 504.

In FIG. 12, a bus architecture (represented by a bus 506), namely, the bus 506 may include any number of interconnected buses and bridges, and various circuits of one or more processors represented by the processor 504 and a memory represented by the memory 505 are linked together by the bus 506. The bus 506 may further link various other circuits such as a peripheral device, a voltage stabilizer and a power management circuit together, which are publicly known in the art and therefore are not further described herein. A bus interface 503 provides an interface between the bus 506 and the transceiver 501. The transceiver 501 may be one or components, for example, receivers and transmitters, and provides a device configured to be in communication with various other apparatuses on a transmission medium. The data processed by the processor 504 are communicated on a wireless medium through an antenna 502, and further, the antenna 502 further receives the data and transfers the data to the processor 504.

The processor 504 is responsible for managing the bus 506 and usual processing, and may further provide various functions, including timing, a peripheral interface, voltage regulating, power source management, and other control functions. The memory 505 may be configured to store data used by the processor 504 during operation execution.

In one embodiment, the processor 504 may be a central processing unit (CPU), an application specific integrated circuit (ASIC), a field-programmable gate array (FPGA), or a complex programmable logic device (CPLD).

Figure 13:
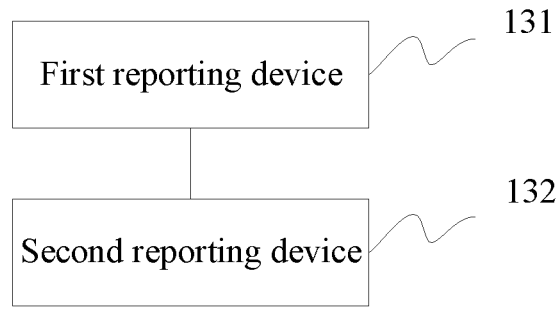
FIG. 13 is a schematic structural diagram of another signal measurement reporting apparatus at a terminal side provided by an embodiment of the present application.

At a terminal side, referring to FIG. 13, another signal measurement reporting apparatus provided by an embodiment of the present application, includes: a first reporting device 131, configured to acquire one or more cell-specific first reference signals (RSs) transmitted by a network in M downlink beam directions of one or more first downlink beam sets for different cells, measure the one or more first RSs by using first RS configuration information to obtain one or more first beam information reporting values, and report the one or more first beam information reporting values to the network, where M is greater than 1; and a second reporting device 132, configured to acquire one or more second RSs transmitted by the network in N downlink beam directions of one or more second downlink beam sets for the different cells, measure the one or more second RSs by using second RS configuration information to obtain one or more second beam information reporting values, and report the one or more second beam information reporting values to the network, and 1<=N<M, and the one or more second downlink beam sets are determined by the network by using the one or more first beam information reporting values.

In one embodiment, the one or more first beam information reporting values include one or a combination of the following information: a first beam information measurement value, a cell ID, an RS resource ID, or a beam direction.

In one embodiment, the first beam information measurement value includes: a reference signal received power (RSRP), a signal-to-interference and noise ratio (SINR), and/or a reference signal received quality (RSRQ).

In one embodiment, the one or more second beam information reporting values include one or a combination of the following information: a reference signal time difference (RSTD), or a terminal receiving and transmitting (Rx-Tx) time difference.

In one embodiment, the second RS configuration information is configured by the network in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

In one embodiment, the one or more second RSs and the one or more first RSs have a quasi co-location (QCL) association relationship.

In one embodiment, the one or more first RSs include a new radio (NR) positioning reference signal (PRS), a synchronization signal and PBCH block (SSB), or a channel state information reference signal (CSI-RS); and the one or more second RSs include a NR PRS.

Figure 14:
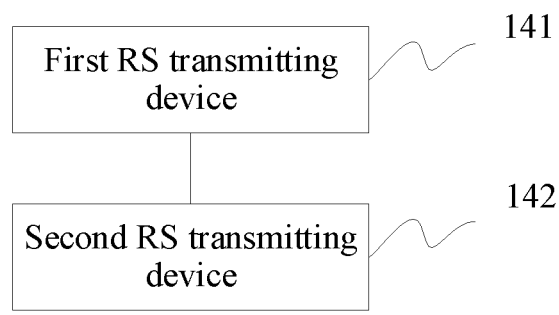
FIG. 14 is a schematic structural diagram of another signal communication apparatus at a base station side provided by an embodiment of the present application.

At a base station side, referring to FIG. 14, another signal communication apparatus provided by an embodiment of the present application, includes: a first RS transmitting device 141, configured to transmit one or more cell-specific first reference signals (RSs) in M downlink beam directions of one or more first downlink beam sets for different cells, where M is greater than 1; and a second RS transmitting device 142, configured to transmit one or more second RSs in N downlink beam directions of one or more second downlink beam sets for the different cells, where 1<=N<M.

In one embodiment, the apparatus further includes: a configuration information notifying device (not shown in the figure), configured to acquire one or more first beam information reporting values for the different cells reported by a terminal in a current cell; determine the one or more second downlink beam sets for the different cells by using a QCL association relationship of the one or more first RSs and the one or more second RSs and the one or more first beam information reporting values; interact the one or more second downlink beam sets between a serving gNB and a non-serving gNB of the terminal; and notify the terminal of second RS configuration information of the one or more second downlink beam sets.

In one embodiment, the determining the one or more second downlink beam sets by using the QCL association relationship of the one or more first RSs and the one or more second RSs and the one or more first beam information reporting values, includes: configuring one or more second downlink beam sets with different beam directions for each terminal of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered through a DCI signaling.

Figure 15:
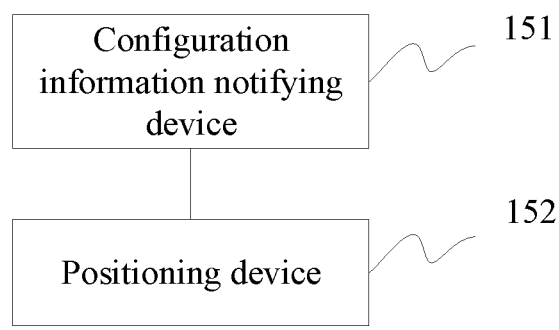
FIG. 15 is a schematic structural diagram of another positioning apparatus at a positioning server side provided by an embodiment of the present application.

At a positioning server side, referring to FIG. 15, another positioning apparatus provided by an embodiment of the present application, includes: a configuration information notifying device 151, configured to notify a base station and a terminal of cell-specific first reference signal (RS) configuration information respectively, to enable the base station to transmit one or more first RSs to the terminal according to the first RS configuration information, and to enable the terminal to receive the one or more first RSs according to the first RS configuration information, where the one or more first RSs are cell-specific first RSs transmitted to the terminal in M downlink beam directions of one or more first downlink beam sets for different cells, and M is greater than 1; and a positioning device 152, configured to acquire one or more second beam information reporting values reported by the terminal by performing measurement on one or more second RSs by using second RS configuration information of one or more second downlink beam sets for the different cells, and calculate a location where the terminal is located based on the one or more second beam information reporting values, where the one or more second downlink beam sets include N downlink beam directions, and 1<=N<M.

In one embodiment, the configuration information notifying device 151 is further configured to: acquire one or more first beam information reporting values reported by the terminal based on the terminal performing measurement on the one or more first RSs; and determine the one or more second downlink beam sets by using a QCL association relationship of the one or more first RSs and the one or more second RSs as well as the first beam information reporting values, and notify the base station and the terminal of the second RS configuration information of the one or more second downlink beam sets.

In one embodiment, the determining the one or more second downlink beam sets by using the QCL association relationship of the one or more first RSs and the one or more second RSs and the one or more first beam information reporting values, includes: configuring one or more second downlink beam sets with different beam directions for each terminals of the different cells respectively by using the QCL association relationship of the one or more first RSs and the one or more second RSs; or configuring one or more second downlink beam sets with a same beam direction for terminals in a same cell by using the QCL association relationship of the one or more first RSs and the one or more second RSs in a case that terminals in the same cell have the same one or more beam directions.

In one embodiment, the second RS configuration information is configured in a UE-specific configuration mode or a UE group-specific configuration mode, where the UE-specific configuration mode indicates that each terminal is separately configured with a beam direction, and the UE group-specific configuration mode indicates that one group of terminals in a same cell is configured with a same beam direction.

In one embodiment, the UE-specific configuration mode or the UE group-specific configuration mode is a periodic RS configuration, a semi-persistent RS configuration and an aperiodic RS configuration.

In one embodiment, the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered through a DCI signaling.

It should be noted that dividing of devices in the embodiments of the present application is schematic and only a kind of logical function dividing, and there may be other dividing modes in actual implementation. In addition, all functional devices in all the embodiments of the present application may be integrated in one processing device, or all the devices exist independently and physically, or the two or more devices are integrated in one device. The above integrated device may be implemented in a hardware form or in a software function device form.

The integrated device can be stored in a computer readable storage medium when being implemented in the software function device form and serving as an independent product to be sold or used. Based on this understanding, the embodiments of the present application essentially, or parts contributing to the prior art, or all or parts of the embodiments can be embodied in a software product form. A computer software product is stored in a storage medium, and includes a plurality of instructions configured to cause a computer device (may be a personal computer, a server, a network device, etc.) or a processor to execute all or part of the steps of the methods in all the embodiments of the present application. The aforementioned storage mediums include: various mediums for storing program codes, such as a USB disk, a mobile hard disk, a read-only memory (ROM), a random access memory (RAM), a diskette or an optical disk.

An embodiment of the present application provides a computing device. The computing device may specifically be a desktop computer, a portable computer, a smart phone, a tablet computer, a personal digital assistant (PDA) and so on. The computing device may include a center processing device (CPU), a memory, input/output devices and so on, the input device may include a keyboard, a mouse, a touch screen and so on, and the output device may include a display device, such as a liquid crystal display (LCD) and a cathode ray tube (CRT).

The memory may include the ROM and the RAM, and provides program instructions and data stored in the memory to the processor. In the embodiment of the present application, the memory can be configured to store a program of any method provided by the embodiments of the present application.

The processor is configured to execute any method provided by the embodiments of the present application according to the obtained program instructions by calling the program instructions stored in the memory.

An embodiment of the present application provides a computer storage medium, configured to store computer program instructions used by the apparatuses provided by the above embodiments of the present application. The computer program instructions include programs configured to execute any method provided by the embodiments of the present application.

The computer storage medium may be any available medium for being accessed by a computer or a data storage device, including but not limited to a magnetic memory (such as a floppy disk, a hard disk, a magnetic tape and a magnetic optical (MO)), an optical memory (such as a CD, a DVD, a BD, and an HVD), and a semiconductor memory (such as a ROM, an EPROM, an EEPROM, a nonvolatile memory (NAND FLASH) and a solid state disk (SSD)), and so on.

The methods provided by the embodiments of the present application may be applied to terminal devices or network devices.

The terminal devices may also be referred to as user equipment ("UE" for short), a mobile station ("MS" for short), a mobile terminal and so on. In one embodiment, the terminal can have the capability of being in communication with one or more core networks through a radio access network (RAN). For example, the terminal may be a mobile telephone (or referred to as a "cellular" telephone), or a computer having the mobile nature, for example, the terminal may further be a portable mobile apparatus, a pocket mobile apparatus, a handheld mobile apparatus, a computer built-in mobile apparatus or a vehicle-mounted mobile apparatus.

The network devices may be a base station (for example, an access point), referring to devices in communication with a radio terminal on an air interface in an access network through one or more sectors. The base station may be configured to perform interconversion on a received air frame and IP groups and serve as a router between the radio terminal and the rest part of the access network, and the rest part of the access network may include an internet protocol (IP) network. The base station can further coordinate attribute management on the air interface. For example, the base station may be a base transceiver station (BTS) in GSM or CDMA, or a base station (NodeB) in WCDMA, or an evolutional base station (NodeB or eNB or e-NodeB, evolutional Node B,) in an LTE, or gNB in a 5G system, and so on, which is not limited in the embodiments of the present application.

The processing flow of the above methods may be implemented through a software program. The software program can be stored in the storage medium. The steps of the above methods are executed when the stored software program is called.

In conclusion, when the base station has downlink transmitting beams, the present application can effectively reduce the PRS resource overheads and reduce the UE received power consumption under the condition of ensuring the PRS positioning measurement precision.

The embodiments of the present application may be provided as methods, systems or computer program products. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, an optical memory and the like) containing computer available program codes.

The present application is described with reference to flow charts and/or block diagrams of the methods, the devices (systems), and the computer program products according to the embodiments of the present application. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing devices to generate a machine, such that the instructions, when executed by the processor of the computers or other programmable data processing devices, generate an apparatus for implementing functions specified in one or more flows in the flow charts and/or one or more blocks in the block diagrams.

These computer program instructions may also be stored in a computer readable memory which can guide the computers or other programmable data processing devices to work in a specific mode, thus the instructions stored in the computer readable memory generates an article of manufacture that includes a commander apparatus that implement the functions specified in one or more flows in the flow charts and/or one or more blocks in the block diagrams.

The computer program instructions may also be loaded to the computers or other programmable data processing devices, so that a series of operating steps may be executed on the computers or other programmable devices to generate computer-implemented processing, such that the instructions executed on the computers or other programmable devices provide steps for implementing the functions specified in one or more flows in the flow charts and/or one or more blocks in the block diagrams.

What is claimed is:

1. A signal measurement reporting method, comprising:
acquiring one or more first reference signals (RSs) transmitted by a network side in M downlink beam directions of one or more first downlink beam sets for different cells, measuring the one or more first RSs by using first RS configuration information to obtain one or more first beam information reporting values, and reporting the one or more first beam information reporting values to the network side, wherein the M is greater than 1; and
acquiring one or more second RSs transmitted by the network side in N downlink beam directions of one or more second downlink beam sets for the different cells, measuring the one or more second RSs by using second RS configuration information to obtain one or more second beam information reporting values, and reporting the one or more second beam information reporting values to the network side, wherein 1<=N<M, and the one or more second downlink beam sets are determined by the network side by using the one or more first beam information reporting values;
wherein the one or more first beam information reporting values comprise a beam direction;
wherein the one or more second beam information reporting values comprise a reference signal time difference (RSTD) and a terminal receiving or transmitting (Rx–Tx) time difference.

2. The method according to claim 1, wherein the second RS configuration information is configured by the network side in a user equipment (UE)-specific configuration mode or a UE group-specific configuration mode, wherein the UE-specific configuration mode indicates that each terminal is separately configured with a beam direction, and the UE group-specific configuration mode indicates that one group of terminals in a same cell is configured with a same beam direction.

3. The method according to claim 2, wherein the UE-specific configuration mode or the UE group-specific configuration mode is a periodic RS configuration, a semi-persistent RS configuration and an aperiodic RS configuration;
wherein the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

4. The method according to claim 1, wherein the one or more second RSs and the one or more first RSs have a quasi co-location (QCL) association relationship.

5. A signal measurement reporting apparatus, comprising:
a memory, configured to store a program instruction; and
a processor, configured to call the program instruction stored in the memory, and according to an obtained program, execute the method of claim 1.

6. A signal communication method, comprising:
transmitting one or more first reference signals (RSs) in M downlink beam directions of one or more first downlink beam sets for different cells, and receiving one or more first beam information reporting values reported by a terminal measuring the one or more first RSs by using first RS configuration information, wherein the M is greater than 1; and
transmitting one or more second RSs in N downlink beam directions of one or more second downlink beam sets for the different cells, and receiving one or more second beam information reporting values reported by the terminal measuring the one or more second RSs by using second RS configuration information, wherein $1<=N<M$;
wherein the one or more first beam information reporting values comprise a beam direction;
wherein the one or more second beam information reporting values comprise a reference signal time difference (RSTD) and a terminal receiving or transmitting (Rx– Tx) time difference.

7. The method according to claim 6, wherein the transmitting the one or more first RSs in the M downlink beam directions of the one or more first downlink beam sets for the different cells, comprises: transmitting the one or more first RSs in the M downlink beam directions of the one or more first downlink beam sets for the different cells according to first RS configuration information, wherein the first RS configuration information is obtained from a positioning server LMF; and
the transmitting the one or more second RSs in the N downlink beam directions of the one or more second downlink beam sets for the different cells, comprises: transmitting the one or more second RSs in the N downlink beam directions of the one or more second downlink beam sets for the different cells according to second RS configuration information, wherein the second RS configuration information is obtained from the LMF.

8. The method according to claim 6, wherein the transmitting the one or more first RSs in the M downlink beam directions of the one or more first downlink beam sets for the different cells, comprises: transmitting the one or more first RSs in the M downlink beam directions of the one or more first downlink beam sets for the different cells according to first RS configuration information, wherein the first RS configuration information is obtained from a positioning server LMF;
the method further comprises: acquiring one or more first beam information reporting values for the different cells reported by a terminal in a current cell, and determining the one or more second downlink beam sets for the different cells by using a quasi co-location (QCL) association relationship of the one or more first RSs and the one or more second RSs and the one or more first beam information reporting values; interacting the one or more second downlink beam sets between a serving gNB and a non-serving gNB of the terminal; and notifying the terminal of second RS configuration information of the one or more second downlink beam sets; and
the transmitting the one or more second RSs in the N downlink beam directions of the one or more second downlink beam sets for the different cells, comprises: transmitting the one or more second RSs in the N downlink beam directions of the one or more second downlink beam sets according to the second RS configuration information.

9. The method according to claim 8, wherein the determining the one or more second downlink beam sets by using the QCL association relationship of the one or more first RSs and the one or more second RSs and the one or more first beam information reporting values, comprises:
configuring one or more second downlink beam sets with different beam directions for each terminal of the different cells respectively by using the QCL association relationship of the one or more first RSs and the one or more second RSs; or
configuring one or more second downlink beam sets with a same beam direction for a plurality of terminals in a same cell by using the QCL association relationship of the one or more first RSs and the one or more second RSs in a case that the plurality of terminals in the same cell have the same one or more beam directions.

10. The method according to claim 8, wherein the second RS configuration information is configured in a UE-specific configuration mode or a UE group-specific configuration mode, wherein the UE-specific configuration mode indicates that each terminal is separately configured with a beam direction, and the UE group-specific configuration mode indicates that one group of terminals in a same cell is configured with a same beam direction.

11. The method according to claim 10, wherein the UE-specific configuration mode or the UE group-specific configuration mode is a periodic RS configuration, a semi-persistent RS configuration and an aperiodic RS configuration;
wherein the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered by a DCI signaling.

12. A signal communication apparatus, comprising:
a memory, configured to store a program instruction; and
a processor, configured to call the program instruction stored in the memory, and according to an obtained program, execute the method of claim 6.

13. A positioning method, comprising:
notifying a base station and a terminal of first reference signal (RS) configuration information respectively to enable the base station to transmit one or more first RSs to the terminal according to the first RS configuration information, and to enable the terminal to receive the one or more first RSs according to the first RS configuration information, acquiring one or more first beam information reporting values reported by the terminal based on the terminal performing measurement on the one or more first RSs; wherein the one or more first RSs are one or more first RSs transmitted to the terminal in M downlink beam directions of one or more first downlink beam sets for different cells, and the M is greater than 1; and acquiring one or more second beam information reporting values reported by the terminal by performing measurement on one or more second RSs by using second RS configuration information of one or more second downlink beam sets for the different cells, and calculating a location where the terminal is located based on the one or more second beam information reporting values, wherein the one or more second downlink beam sets comprise N downlink beam directions and 1<=N<M;

wherein the one or more first beam information reporting values comprise a beam direction;

wherein the one or more second beam information reporting values comprise a reference signal time difference (RSTD) and a terminal receiving or transmitting (Rx–Tx) time difference.

14. The method according to claim 13, further comprising:
determining the one or more second downlink beam sets by using a quasi co-location (QCL) association relationship of the one or more first RSs and the one or more second RSs and the one or more first beam information reporting values, and notifying the base station and the terminal of the second RS configuration information of the one or more second downlink beam sets.

15. The method according to claim 14, wherein the determining the one or more second downlink beam sets by using the QCL association relationship of the one or more first RSs and the one or more second RSs and the one or more first beam information reporting values, comprises:
configuring one or more second downlink beam sets with different beam directions for each terminal of the different cells respectively by using the QCL association relationship of the one or more first RSs and the one or more second RSs; or
configuring one or more second downlink beam sets with a same beam direction for a plurality of terminals in a same cell by using the QCL association relationship of the one or more first RSs and the one or more second RSs in a case that the plurality of terminals in the same cell have the same one or more beam directions.

16. The method according to claim 14, wherein the second RS configuration information is configured in a user equipment (UE)-specific configuration mode or a UE group-specific configuration mode, wherein the UE-specific configuration mode indicates that each terminal is separately configured with a beam direction, and the UE group-specific configuration mode indicates that one group of terminals in a same cell is configured with a same beam direction.

17. The method according to claim 16, wherein the UE-specific configuration mode or the UE group-specific configuration mode is a periodic RS configuration, a semi-persistent RS configuration and an aperiodic RS configuration;
wherein the periodic RS configuration is triggered by a radio resource control (RRC) signaling, a downlink control information (DCI) signaling or an LTE positioning protocol (LPP) message; and the semi-persistent RS configuration and the aperiodic RS configuration are triggered through a DCI signaling.

18. A positioning apparatus, comprising:
a memory, configured to store a program instruction; and
a processor, configured to call the program instruction stored in the memory, and according to an obtained program, execute the method of claim 13.

* * * * *